(12) United States Patent
Otsuki

(10) Patent No.: US 6,328,419 B2
(45) Date of Patent: *Dec. 11, 2001

(54) DOT PRINTING USING PARTIAL OVERLAP SCHEME

(75) Inventor: Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/776,834

(22) Filed: Feb. 6, 2001

Related U.S. Application Data

(63) Continuation of application No. 09/366,596, filed on Aug. 3, 1999.

(30) Foreign Application Priority Data

Aug. 6, 1998 (JP) .................................................. 10-236569
Aug. 6, 1998 (JP) .................................................. 10-236570

(51) Int. Cl.$^7$ .............................. B41J 2/145; B41J 2/15; B41J 2/21; B41J 29/38

(52) U.S. Cl. ................................... 347/41; 347/43; 347/16
(58) Field of Search ..................... 347/40, 41, 16, 347/12, 14, 43

(56) References Cited

U.S. PATENT DOCUMENTS 5,946,011 * 8/1999 Kanaya ................................. 347/41
6,217,149 * 4/2001 Tagaki et al. ......................... 347/41

* cited by examiner

*Primary Examiner*—Thinh Nguyen
(74) *Attorney, Agent, or Firm*—Oblon, Spivak, McClelland, Maier & Neustadt, P.C.

(57) ABSTRACT

A print head has a nozzle array to achieve printing of dots of identical color along a plurality of main scanning lines during a main scanning pass, and to achieve formation of multiple dots of the color at a substantially fixed pitch in a sub-scanning direction. Partial overlap printing is effected, using a specific part of the plurality of dot forming elements, by executing dot printing in one main scanning pass on at least one target main scanning line which is also a target of dot printing during another main scanning pass.

9 Claims, 29 Drawing Sheets

FIRST EMBODIMENT

Fig.11
 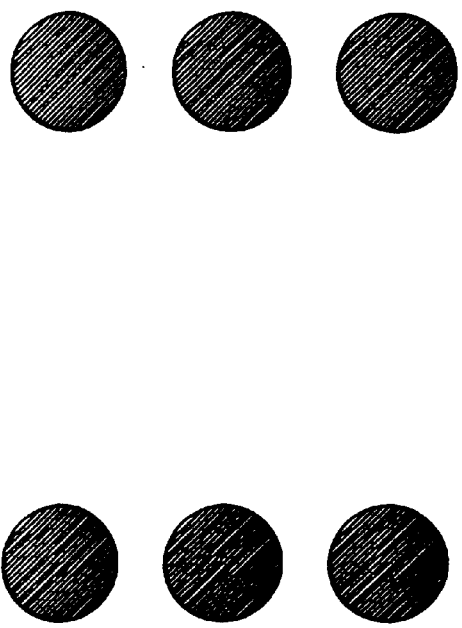
1ST
Fig.12
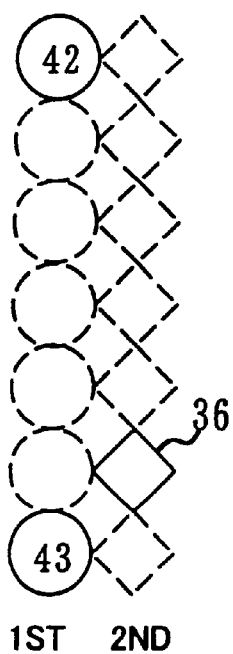 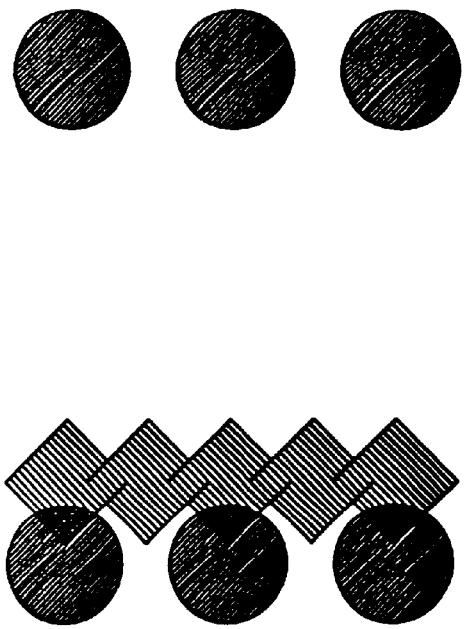
1ST  2ND

PARAMETERS

Nozzle pitch k : 3 [dots]
Number of nozzles used N : 4

| Number of secondary scanning feeds | 0 | 1 | 2 | 3 |
|---|---|---|---|---|
| Quantity of feed F(dots) | 0 | 4 | 4 | 4 |
| ΣF | 0 | 4 | 8 | 12 |
| OF=(ΣF)%k | 0 | 1 | 2 | 0 |

FIRST COMPARATIVE EXAMPLE

Number of used nozzles N = 14
Number of basic nozzles Na = 9
Number of additional nozzles Nb = 5
Nozzle pitch k = 4
Sub-scan feed amount F = 9 dots
(m=2, L=2)

$N = Na + Nb$ ···(1)
$Na = m \times k \pm 1$ ···(2)
$Nb = Rd[L \times Na \div k]$ ···(3)
$F = Na$ ···(4)

1○~#9○ : Basic nozzles
10●~#14● : Additional nozzles

Fig.16
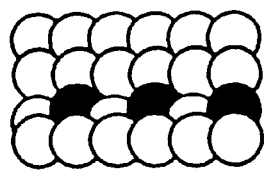 ← Banding is inconspicuous.
 Dots recorded by basic nozzles
● Dots recorded by additional nozzles

Fig. 18

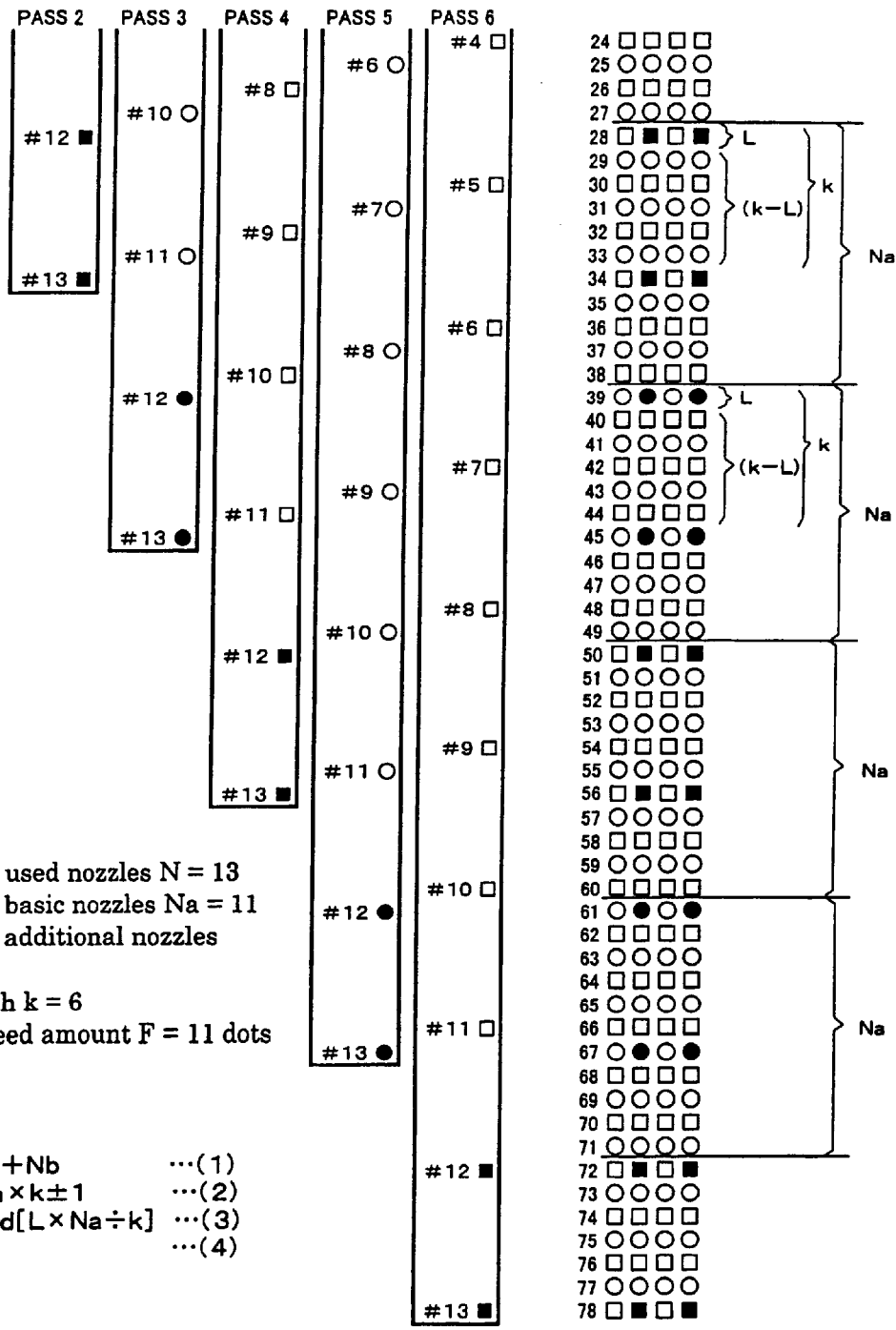

SECOND COMPARATIVE EXAMPLE

Number of used nozzles N = 13
Number of basic nozzles Na = 11
Number of additional nozzles
Nb = 2
Nozzle pitch k = 6
Sub-scan feed amount F = 11 dots
(m=2, L=1)

$N = Na + Nb$ ···(1)
$Na = m \times k \pm 1$ ···(2)
$Nb = Rd[L \times Na \div k]$ ···(3)
$F = Na$ ···(4)

○ : Dot formed by basic nozzle in forward pass    □ : Dot formed by basic nozzle in reverse pass
● : Dot formed by additional nozzle in forward pass    ■ : Dot formed by additional nozzle in reverse pass

Fig. 20

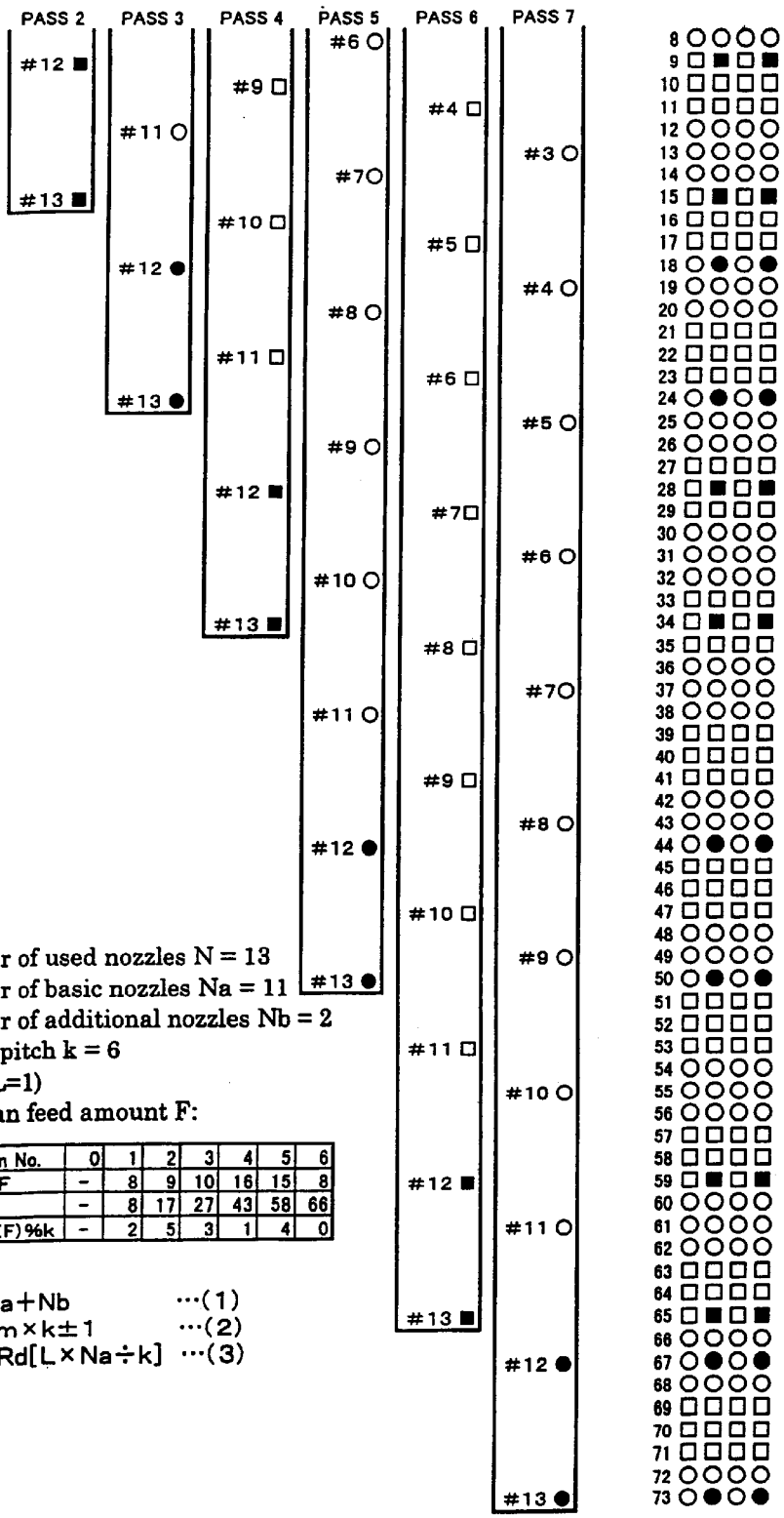

Number of used nozzles N = 13
Number of basic nozzles Na = 11
Number of additional nozzles Nb = 2
Nozzle pitch k = 6
(m=2, L=1)
Sub-scan feed amount F:

| sub-scan No. | 0 | 1 | 2 | 3 | 4 | 5 | 6 |
|---|---|---|---|---|---|---|---|
| amount F | - | 8 | 9 | 10 | 16 | 15 | 8 |
| ΣF | - | 8 | 17 | 27 | 43 | 58 | 66 |
| OF=(ΣF)%k | - | 2 | 5 | 3 | 1 | 4 | 0 |

$N = Na + Nb$ ···(1)
$Na = m \times k \pm 1$ ···(2)
$Nb = Rd[L \times Na \div k]$ ···(3)

○ : Dot formed by basic nozzle in forward pass   □ : Dot formed by basic nozzle in reverse pass
● : Dot formed by additional nozzle in forward pass   ■ : Dot formed by additional nozzle in reverse pass

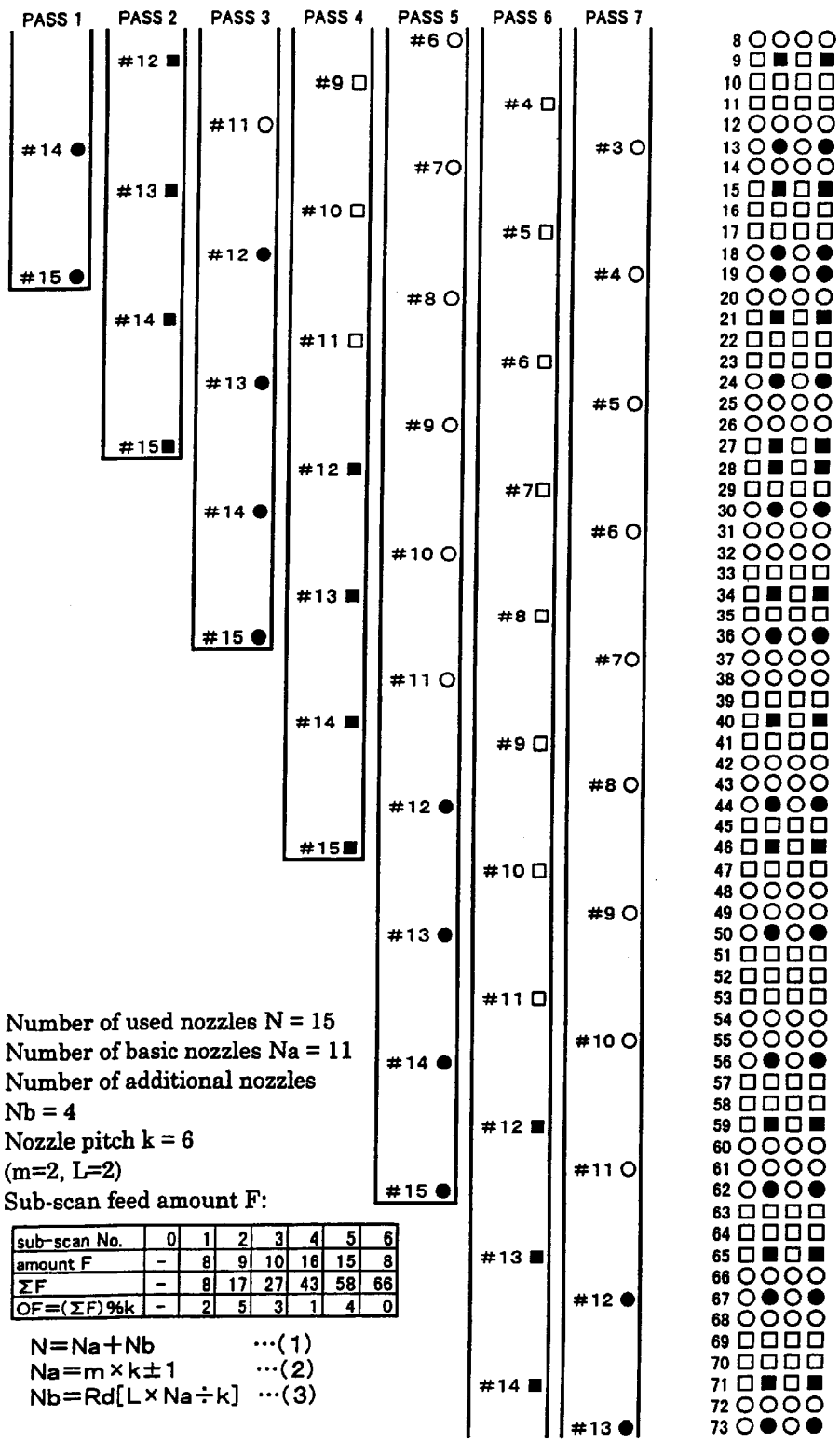
Fig. 23 FOURTH EMBODIMENT

Fig. 24 DOT POSITIONS IN FOURTH EMBODIMENT
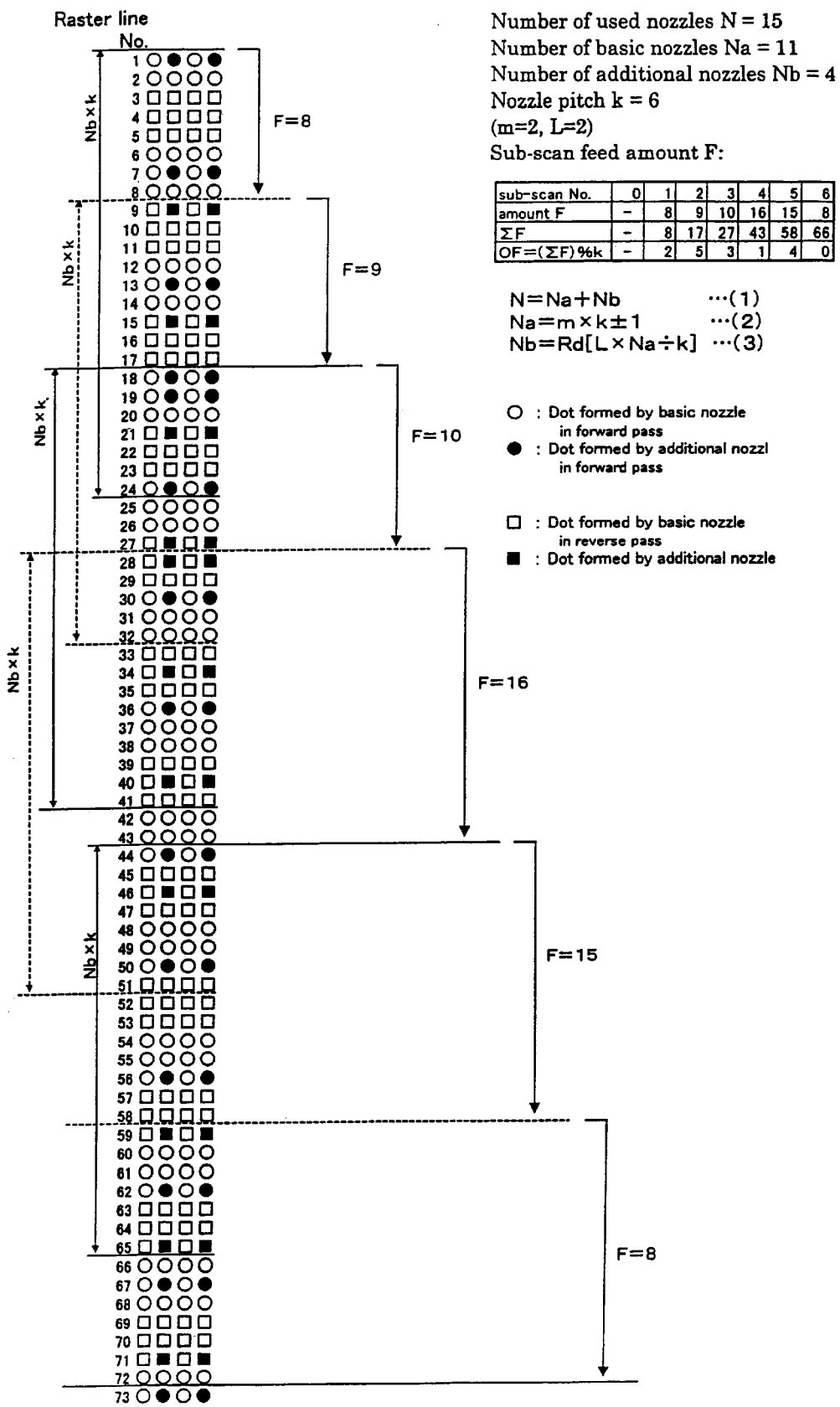

POSSIBLE COMBINATIONS FOR k=6 AND L=1

| k | m | Na | L | Nb | N |
|---|---|---|---|---|---|
| 6 | 1 | 5 | 1 | 1 | 6 |
| 6 | 1 | 7 | 1 | 2 | 9 |
| 6 | 2 | 11 | 1 | 2 | 13 |
| 6 | 2 | 13 | 1 | 3 | 16 |
| 6 | 2 | 17 | 1 | 3 | 20 |
| 6 | 3 | 19 | 1 | 4 | 23 |
| 6 | 4 | 23 | 1 | 4 | 27 |
| 6 | 4 | 25 | 1 | 5 | 30 |
| 6 | 5 | 29 | 1 | 5 | 34 |
| 6 | 5 | 31 | 1 | 6 | 37 |
| 6 | 6 | 35 | 1 | 6 | 41 |
| 6 | 6 | 37 | 1 | 7 | 44 |
| 6 | 7 | 41 | 1 | 7 | 48 |
| 6 | 7 | 43 | 1 | 8 | 51 |
| 6 | 8 | 47 | 1 | 8 | 55 |
| 6 | 8 | 49 | 1 | 9 | 58 |
| 6 | 9 | 53 | 1 | 9 | 62 |
| 6 | 9 | 55 | 1 | 10 | 65 |
| 6 | 10 | 59 | 1 | 10 | 69 |
| 6 | 10 | 61 | 1 | 11 | 72 |
| 6 | 11 | 65 | 1 | 11 | 76 |
| 6 | 11 | 67 | 1 | 12 | 79 |
| 6 | 12 | 71 | 1 | 12 | 83 |
| 6 | 12 | 73 | 1 | 13 | 86 |
| 6 | 13 | 77 | 1 | 13 | 90 |
| 6 | 13 | 79 | 1 | 14 | 93 |

POSSIBLE COMBINATIONS FOR k=6 AND L=2

| k | m | Na | L | Nb | N |
|---|---|---|---|---|---|
| 6 | 1 | 5 | 2 | 2 | 7 |
| 6 | 1 | 7 | 2 | 3 | 10 |
| 6 | 2 | 11 | 2 | 4 | 15 |
| 6 | 2 | 13 | 2 | 5 | 18 |
| 6 | 3 | 17 | 2 | 6 | 23 |
| 6 | 3 | 19 | 2 | 7 | 26 |
| 6 | 4 | 23 | 2 | 8 | 31 |
| 6 | 4 | 25 | 2 | 9 | 34 |
| 6 | 5 | 29 | 2 | 10 | 39 |
| 6 | 5 | 31 | 2 | 11 | 42 |
| 6 | 6 | 35 | 2 | 12 | 47 |
| 6 | 6 | 37 | 2 | 13 | 50 |
| 6 | 7 | 41 | 2 | 14 | 55 |
| 6 | 7 | 43 | 2 | 15 | 58 |
| 6 | 8 | 47 | 2 | 16 | 63 |
| 6 | 8 | 49 | 2 | 17 | 66 |
| 6 | 9 | 53 | 2 | 18 | 71 |
| 6 | 9 | 55 | 2 | 19 | 74 |
| 6 | 10 | 59 | 2 | 20 | 79 |
| 6 | 10 | 61 | 2 | 21 | 82 |
| 6 | 11 | 65 | 2 | 22 | 87 |
| 6 | 11 | 67 | 2 | 23 | 90 |
| 6 | 12 | 71 | 2 | 24 | 95 |
| 6 | 12 | 73 | 2 | 25 | 98 |
| 6 | 13 | 77 | 2 | 26 | 103 |
| 6 | 13 | 79 | 2 | 27 | 106 |

POSSIBLE COMBINATIONS FOR k=6 AND L=3

| k | m | Na | L | Nb | N |
|---|---|---|---|---|---|
| 6 | 1 | 5 | 3 | 3 | 8 |
| 6 | 1 | 7 | 3 | 4 | 11 |
| 6 | 2 | 11 | 3 | 6 | 17 |
| 6 | 2 | 13 | 3 | 7 | 20 |
| 6 | 3 | 17 | 3 | 9 | 26 |
| 6 | 3 | 19 | 3 | 10 | 29 |
| 6 | 4 | 23 | 3 | 12 | 35 |
| 6 | 4 | 25 | 3 | 13 | 38 |
| 6 | 5 | 29 | 3 | 15 | 44 |
| 6 | 5 | 31 | 3 | 16 | 47 |
| 6 | 6 | 35 | 3 | 18 | 53 |
| 6 | 6 | 37 | 3 | 19 | 56 |
| 6 | 7 | 41 | 3 | 21 | 62 |
| 6 | 7 | 43 | 3 | 22 | 65 |
| 6 | 8 | 47 | 3 | 24 | 71 |
| 6 | 8 | 49 | 3 | 25 | 74 |
| 6 | 9 | 53 | 3 | 27 | 80 |
| 6 | 9 | 55 | 3 | 28 | 83 |
| 6 | 10 | 59 | 3 | 30 | 89 |
| 6 | 10 | 61 | 3 | 31 | 92 |
| 6 | 11 | 65 | 3 | 33 | 98 |
| 6 | 11 | 67 | 3 | 34 | 101 |
| 6 | 12 | 71 | 3 | 36 | 107 |
| 6 | 12 | 73 | 3 | 37 | 110 |
| 6 | 13 | 77 | 3 | 39 | 116 |
| 6 | 13 | 79 | 3 | 40 | 119 |

POSSIBLE COMBINATIONS FOR k=4 AND L=1

| k | m | Na | L | Nb | N |
|---|---|---|---|---|---|
| 4 | 1 | 3 | 1 | 1 | 4 |
| 4 | 1 | 5 | 1 | 2 | 7 |
| 4 | 2 | 7 | 1 | 2 | 9 |
| 4 | 2 | 9 | 1 | 3 | 12 |
| 4 | 3 | 11 | 1 | 3 | 14 |
| 4 | 3 | 13 | 1 | 4 | 17 |
| 4 | 4 | 15 | 1 | 4 | 19 |
| 4 | 4 | 17 | 1 | 5 | 22 |
| 4 | 5 | 19 | 1 | 5 | 24 |
| 4 | 5 | 21 | 1 | 6 | 27 |
| 4 | 6 | 23 | 1 | 6 | 29 |
| 4 | 6 | 25 | 1 | 7 | 32 |
| 4 | 7 | 27 | 1 | 7 | 34 |
| 4 | 7 | 29 | 1 | 8 | 37 |
| 4 | 8 | 31 | 1 | 8 | 39 |
| 4 | 8 | 33 | 1 | 9 | 42 |
| 4 | 9 | 35 | 1 | 9 | 44 |
| 4 | 9 | 37 | 1 | 10 | 47 |
| 4 | 10 | 39 | 1 | 10 | 49 |
| 4 | 10 | 41 | 1 | 11 | 52 |
| 4 | 11 | 43 | 1 | 11 | 54 |
| 4 | 11 | 45 | 1 | 12 | 57 |
| 4 | 12 | 47 | 1 | 12 | 59 |
| 4 | 12 | 49 | 1 | 13 | 62 |
| 4 | 13 | 51 | 1 | 13 | 64 |
| 4 | 13 | 53 | 1 | 14 | 67 |

POSSIBLE COMBINATIONS FOR k=4 AND L=2

| k | m | Na | L | Nb | N |
|---|---|---|---|---|---|
| 4 | 1 | 3 | 2 | 2 | 5 |
| 4 | 1 | 5 | 2 | 3 | 8 |
| 4 | 2 | 7 | 2 | 4 | 11 |
| 4 | 2 | 9 | 2 | 5 | 14 |
| 4 | 3 | 11 | 2 | 6 | 17 |
| 4 | 3 | 13 | 2 | 7 | 20 |
| 4 | 4 | 15 | 2 | 8 | 23 |
| 4 | 4 | 17 | 2 | 9 | 26 |
| 4 | 5 | 19 | 2 | 10 | 29 |
| 4 | 5 | 21 | 2 | 11 | 32 |
| 4 | 6 | 23 | 2 | 12 | 35 |
| 4 | 6 | 25 | 2 | 13 | 38 |
| 4 | 7 | 27 | 2 | 14 | 41 |
| 4 | 7 | 29 | 2 | 15 | 44 |
| 4 | 8 | 31 | 2 | 16 | 47 |
| 4 | 8 | 33 | 2 | 17 | 50 |
| 4 | 9 | 35 | 2 | 18 | 53 |
| 4 | 9 | 37 | 2 | 19 | 56 |
| 4 | 10 | 39 | 2 | 20 | 59 |
| 4 | 10 | 41 | 2 | 21 | 62 |
| 4 | 11 | 43 | 2 | 22 | 65 |
| 4 | 11 | 45 | 2 | 23 | 68 |
| 4 | 12 | 47 | 2 | 24 | 71 |
| 4 | 12 | 49 | 2 | 25 | 74 |
| 4 | 13 | 51 | 2 | 26 | 77 |
| 4 | 13 | 53 | 2 | 27 | 80 |

POSSIBLE COMBINATIONS FOR k=4 AND L=3

| k | m | Na | L | Nb | N |
|---|---|---|---|---|---|
| 4 | 1 | 3 | 3 | 3 | 6 |
| 4 | 1 | 5 | 3 | 4 | 9 |
| 4 | 2 | 7 | 3 | 6 | 13 |
| 4 | 2 | 9 | 3 | 7 | 16 |
| 4 | 3 | 11 | 3 | 9 | 20 |
| 4 | 3 | 13 | 3 | 10 | 23 |
| 4 | 4 | 15 | 3 | 12 | 27 |
| 4 | 4 | 17 | 3 | 13 | 30 |
| 4 | 5 | 19 | 3 | 15 | 34 |
| 4 | 5 | 21 | 3 | 16 | 37 |
| 4 | 6 | 23 | 3 | 18 | 41 |
| 4 | 6 | 25 | 3 | 19 | 44 |
| 4 | 7 | 27 | 3 | 21 | 48 |
| 4 | 7 | 29 | 3 | 22 | 51 |
| 4 | 8 | 31 | 3 | 24 | 55 |
| 4 | 8 | 33 | 3 | 25 | 58 |
| 4 | 9 | 35 | 3 | 27 | 62 |
| 4 | 9 | 37 | 3 | 28 | 65 |
| 4 | 10 | 39 | 3 | 30 | 69 |
| 4 | 10 | 41 | 3 | 31 | 72 |
| 4 | 11 | 43 | 3 | 33 | 76 |
| 4 | 11 | 45 | 3 | 34 | 79 |
| 4 | 12 | 47 | 3 | 36 | 83 |
| 4 | 12 | 49 | 3 | 37 | 86 |
| 4 | 13 | 51 | 3 | 39 | 90 |
| 4 | 13 | 53 | 3 | 40 | 93 |

Raster
line No.

← Banding is conspicuous.

○ Recorded dots

Fig.30
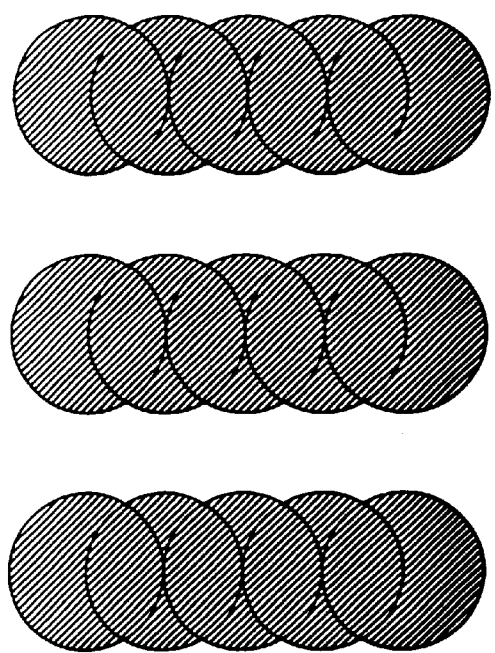
1ST
Fig.31
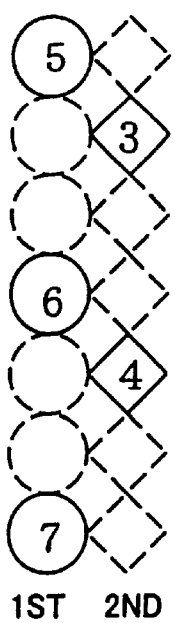
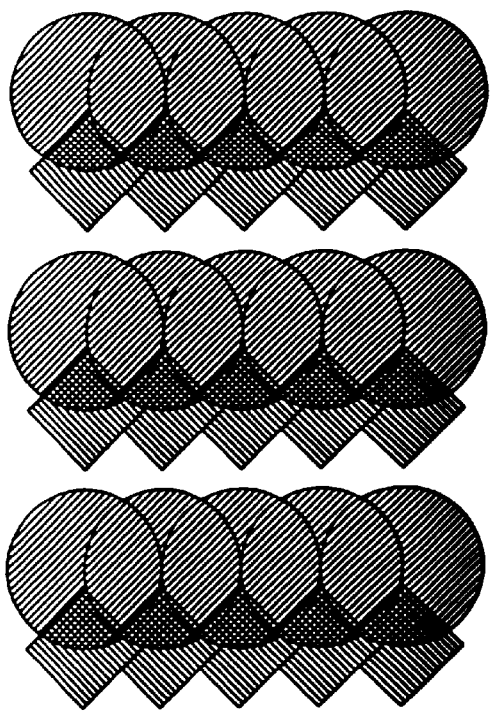
1ST  2ND

DOT PRINTING USING PARTIAL OVERLAP SCHEME

CROSS-REFERENCE TO RELATED APPLICATIONS

This application is a continuation application of Ser. No. 09/366,596 filed Aug. 3, 1999 and claims priority to Japanese Application Nos. 10-236569 filed Aug. 6, 1998 and 10-236570 filed Aug. 6, 1998.

BACKGROUND OF THE INVENTION

1. Field of the Invention

The present invention relates to a technology of printing dots on a printing media using a dot print head.

2. Description of the Related Art

Printing apparatuses that print using a dot print head that scans in a main scanning direction and in a sub-scanning direction include inkjet printersof serial scanning type and drum scanning type. An inkjet printer forms characters and images on a printing medium by jetting ink from a plurality of print head nozzles. Each of the nozzles of the print head is provided with a pressure chamber charged with ink and an electro-mechanical conversion element. When an electrical signal is applied to the electro-mechanical conversion element, pressure is generated in the pressure chamber, causing droplets of ink to be emitted from the nozzle.

One technology for improving the image quality of an inkjet printer is the technology referred to as the interlaced scheme disclosed by U.S. Pat. No. 4,198,642. FIG. 27 illustrates a conventional interlaced printing scheme.Print head 1 has eleven nozzles, denoted as nozzles #1 to #11. The nozzle pitch k is six dots in the sub-scanning direction. Here, the unit referred to as a "dot" signifies the minimum dot pitch P[inch] of dots printed on the printing media in the sub-scanning direction; k dots corresponds to k×P inches. In FIG. 27, the position of the print head 1 described as pass 1, pass 2 . . . is the position in the sub-scanning direction during main scanning. Here, a "pass" means one main scan. After each main scan, a fixed, sub-scan feed amount F of eleven dots takes place.

In the conventional interlaced printing scheme, the following two conditions are set to ensure the main scanning line (hereinafter also referred to as "raster" or "raster line") is printed with no voids or overlaps. The first condition is that there is a mutual prime integer relationship between the number N of nozzles used and the nozzle pitch k. (Here, "mutually prime" means that there is no common divisor other than 1.) The second condition is that the amount of sub-scan feed amount F equals the number N of nozzles used.

Inkjet printers are subject to the two demands of higher printing speed and better quality. Printing speed can be increased by increasing the number of nozzles used. However, in accordance with the conventional interlaced printing scheme the feed amount F in the sub-scanning direction is set to be the same as the number N of nozzles used, so increasing the number of nozzles also means increasing the sub-scan feed amount F.

However, the mechanical precision of the sub-scan feed is degraded substantially proportionally to the increase in the amount of sub-scan feed. Thus, increasing the number of nozzles degrades the precision of the sub-scan feed. In particular, when a multiplicity of sub-scan feeds are used between adjacent raster lines, the error incurred becomes cumulative and can cause the pitch between adjacent raster lines to deviate from the correct pitch. For example, in the case of FIG. 27 five sub-scan feeds are implemented between No. 5 raster line and No. 6 raster line. Therefore, the pitch between these two raster lines includes the accumulated error of the sub-scan feeds.

FIG. 28 is a more detailed view of the printed dots according to the scheme of FIG. 27. The cumulative error of the sub-scan feeds has increased the pitch of the No. 5 and No. 6 raster lines, resulting in stripe-shaped portions of image degradation that are readily noticeable. This type of image degradation is referred to as "banding." Because banding degrades images, there has always been a desire to reduce banding as much as possible.

In recent years color printers that jet ink of several colors from the print head have come into widespread use for multicolor printing of images processed by computers. Such printers use bidirectional printing technology whereby dots are printed during forward and reverse passes.

In bidirectional printing, dots are printed on a number of raster lines during the forward pass of the print head, and during the reverse pass dots are printed on other raster lines. In accordance with this bidirectional printing method, printing speed can be increased since, compared to a method in which dots are formed only during forward pass by the print head, the bidirectional method doubles the dot printing efficiency.

However, under fixed conditions bidirectional printing has been found to produce images in which the colors are not even. Examples of this phenomenon are illustrated by FIGS. 29 to 31. FIG. 29 shows dots formed at a fixed spacing in the sub-scanning direction using a head equipped with seven nozzles. The spacing of the nozzles is equivalent to four times the printing pitch of the dots in the sub-scanning direction. On the left-hand side of FIG. 29, the numbers 1 to 7 shown in round or diamond-shaped symbols indicate the position of the nozzles in the sub-scanning direction. Specifically, the round symbols indicate the position of the nozzles during the forward pass, and the diamond-shaped symbols indicate the position of the nozzles during the reverse pass. The "1st," "2nd" and so on noted by the nozzles indicate the ordinal number of the main scanning pass by the print head. After each main scan, the paper is moved in the sub-scanning direction by the amount of seven dots. On the right-hand side of FIG. 29 is shown the arrangement of dots printed by the above-described scanning of the print head. Here, circles represent dots formed during the forward pass, and diamonds are dots formed during the reverse pass. Although a diamond shape is used to indicate a position of a nozzle or dot, the nozzles and dots are actually substantially round in shape, the diamond shape being used just to readily differentiate the positions of nozzles and dots. This also applies hereinbelow with respect to descriptions of other drawings.

It will be considered that, as shown in FIG. 29, regions F1, B1, F2 are printed at a uniform hue respectively. FIG. 30 is an enlarged view of dots of region F1 of FIG. 29, formed during a first main scanning pass. The round hatching portions on the right in FIG. 30 indicate dots. To prevent gaps between adjacent raster lines, the dots are formed with a diameter that is slightly larger than the pitch of the dots printed. Dot diameter also depends on the amount of ink that is jetted per unit area of the printing paper. When dot is formed at every pixel on each raster line as shown in FIG. 30, for example, the inkjet amount per unit area is increased and the dot diameter is also increased.

FIG. 31 shows dots formed during a second main scanning pass. The dots formed during the second scanning pass, that is, dots formed during the reverse pass of the print head, are shown as hatched diamonds. As shown, these dots are formed with a large area of overlap with the dots formed by the first main scanning pass (the circles in FIG. 31).

When a print head is used having colored inks arrayed in a row in the main scanning direction, the order in which ink is jetted at the printing position differs from the forward pass to the reverse pass. Take, for example, the print head shown in FIG. 5. FIG. 5 is a plan view of the head, which has six colored inks arrayed from the left in the main scanning direction, the six colors being black (K), cyan (C), light cyan (LC), magenta (M), light magenta (LM) and yellow (Y). When the head is moved to the right (forward pass), with respect to FIG. 5, for a given pixel the inks are jetted in the order of Y, LM, M, LC, C, K. When the head is moved to the left (reverse pass), the inks are jetted in the reverse order. Thus, the forward ink jetting order differs from the reverse ink jetting order, so the order in which the inks penetrate the paper differs. As a result, even if the same quantities of each ink are jetted, there are subtle changes in the hue obtained.

With reference to FIG. 31, dots formed during the second main scanning pass partially overlap the dots formed during the first scanning pass. Based on the effect described above, there is a subtle difference between the hue of dots formed during the first scanning pass and the hue of dots formed during the second scanning pass. It is known that when printing is executed with this subtle difference in hue, the hue of the dots first formed predominates. Thus, in the case of the region F1 in FIG. 29, the predominant hue is that of the dots formed during the forward pass.

Conversely, in the case of region B1 of FIG. 29, it is the hue of the dots formed during the reverse pass that predominates. From FIG. 29, it can be seen that in the case of region B1, the first dots of the second scanning pass are those formed using nozzles No. 5 to No. 7. Conversely, therefore, to the case of region F1, it is the hue of the dots formed during the reverse pass that forms the dominant hue. In the case of region F2, as in region F1, the predominant hue is again that of the dots formed during the forward pass.

As described above, when bidirectional printing is implemented the difference between the hues of the dots printed during a forward pass and the hues of the dots printed during a reverse pass gives rise to hues that change in terms of unit regions F1, B1, F2. This is perceived as color non-uniformity that degrades the image quality.

For the above reasons, in dot printing there has been a demand for a technology that efficiently prevents image degradation caused by banding or color non-uniformity.

SUMMARY OF THE INVENTION

Accordingly, an object of the present invention is to provide a dot printing technology that efficiently prevents image degradation.

In order to attain at least part of the above and other objects, the present invention provides a dot printing technique that uses a dot printing head to print dots on a printing medium. The dot forming element array provided on the dot printing head comprises a plurality of dot forming elements arrayed to achieve printing of dots of at least one color along a plurality of main scanning lines during a main scanning pass, and to achieve formation of multiple dots of an identical color at a substantially fixed pitch in a sub-scanning direction. Partial overlap printing is effected, using a specific part of the plurality of dot forming elements, by executing dot printing in one main scanning pass on at least one target main scanning line which is also a target of dot printing during another main scanning pass.

In the partial overlap printing, with respect to the printing of dots of one color, the dot printing is executed in such a manner that main scanning lines are classified into a first type of main scanning line on which two or more dot forming elements are used to complete printing at all dot positions along the main scanning line, and a second type of main scanning line on which a single dot forming element is used to complete printing at all dot positions along the main scanning line. The fact that the first type of main scanning line is printed using two or more different dot forming elements makes it possible for the quality of that portion to be improved. Because the first type of main scanning line requires twice the scanning time required by the second type of main scanning line, they reduce the printing speed. However, since in partial overlap printing a mixture of first and second type main scanning lines are used, the decrease in printing speed can be alleviated compared to if all of the main scanning lines were of the first type.

In a preferred embodiment, the dot printing is executed during forward and reverse main scanning passes. The dot printing head has a plurality of dot forming element arrays for emitting a plurality of inks used to print color images, and an order in which the plurality of inks are emitted at each printing position during a forward pass differs from an order in which the plurality of inks are emitted at each printing position during a reverse pass. The partial overlap printing by the head drive is performed by:

i) classifying next target main scanning lines on which dot printing is to be executed in the next main scanning pass into a first type of target main scanning line and a second type of target main scanning line, the first type of target main scanning line being located at a position that is offset in the sub-scanning direction beyond an endmost main scanning line on which dot printing has been executed, the second type of target main scanning line being other than the first type of target main scanning line;

ii) on the first type of target main scanning line, performing overlap printing by executing dot printing at one of plural types of dot positions into which each main scanning line is divided for printing in multiple main scanning passes; and iii) on the second type of target main scanning line, performing non-overlap printing by executing dot printing at all dot positions on the main scanning line in one main scanning pass.

Here, taking the example of FIG. 29, the "endmost main scanning line" refers to the main scanning line formed by No. 7 nozzle during the first main scanning pass. With reference to the example of FIG. 29, sub-scanning takes place going from top to bottom, relative to the drawing sheet. During the first main scanning pass, in region F1 the main scanning line is formed using nozzles No. 5 to No. 7. The direction of sub-scanning during this, meaning downward in FIG. 29, is the main scanning line formed by No. 7 nozzle. During the second main scanning pass, main scanning lines are formed by nozzles No. 3 to No. 7. The main scanning lines formed using nozzles No. 5 to No. 7 in the second pass are located below the endmost main scanning line formed using No. 7 nozzle in the first pass.

As is clear from FIG. 29, in the second main scanning pass it is nozzles No. 5 to No. 7 that form dots for the first time in region B1. Therefore, in the following explanation, "a first type of target main scanning line located at a position that is offset in the sub-scanning direction beyond an endmost main scanning line on which dot printing has been executed " is also referred to as the "initial dot printing scanning line" or simply as "first type of target main scanning line."

In the foregoing the cause of color non-uniformity in conventional bidirectional printing was explained with reference to FIG. 30. Factors that can be cited as causing color non-uniformity include bleeding, increasing the diameter of the dots first formed, as shown in FIG. 30. A larger dot size increases the size of the region in which the hue of the initially formed dots becomes the predominant hue. When regions formed by the initially formed dots during forward passes alternate with regions formed by the initially formed dots formed during reverse passes, differences in the predominantly manifested hue are perceived as nonuniform coloration.

In accordance with the present invention, the first type of target main scanning line is printed in two or more main scanning passes. Assuming, for example, that all the dots on a main scanning line are printed in two main scanning passes, during the first main scanning pass the odd numbered dot positions are the target of printing, and the even numbered dot positions are the target during the second main scanning pass. This makes it possible to reduce the total amount of ink expelled on the first type of target main scanning line. Thus, it is possible to contain increases in dot size caused by bleeding, thereby inhibiting the predominant manifestation of the hue of the initially formed dots. This makes it possible to reduce color non-uniformity by reducing differences between the hues of regions formed by the dots formed initially on the forward pass and regions formed by the dots formed initially on the reverse pass.

Moreover, when main scanning lines are printed in two or more passes, the number of dots formed on the forward and reverse passes do not have to be equal. If for example a main scanning line is printed in two passes, it can be done in two forward passes, or in two reverse passes, or in one forward and one reverse pass.

In another embodiment, the sub-scanning is executed according to a variable sub-scan feed which uses a combination of differing feed amounts. Application of the variable sub-scan feed can improve the image quality by adjusting proper combination of feed amounts.

It is preferable, when a pitch of the plurality of dot forming elements in the sub-scanning direction is set at k×P (where k is an integer of 3 or more and P is minimum pitch in the sub-scanning direction of dots on the printing medium), a number N of dot forming elements (where N is an integer of 3 or more) used during one main scanning pass and parameters Na, Nb, m, and L satisfy following equations (1) to (3):

$$N=Na+Nb \quad (1)$$

$$Na=m\times k\pm 1 \quad (2)$$

$$Nb=Rd[L\times Na\div k] \quad (3)$$

where m is an integer of 1 or more, L is an integer that satisfies $1\leq L<k$, Nb is the number of the specific part of dot forming elements effecting the partial overlap printing, and operator Rd[ ] indicates the operation of rounding a decimal fraction in the square brackets.

Accordingly, the number of main scanning lines printed using two or more different nozzles can be set at a number that is appropriate from the two viewpoints of relieving the printing speed reduction and improving the image quality.

The present invention can be realized by various configurations including: dot printing method and apparatus, printing method and apparatus, computer programs for realizing the functions of these methods and/or apparatus, computer readable medium for storing such computer programs, and computer data signal embodied in a carrier wave comprising the computer program.

BRIEF DESCRIPTION OF THE DRAWINGS

FIG. 11 is an enlarged view of dots formed in a first main scanning pass.

FIG. 12 is an enlarged view of dots formed up to a second main scanning pass.

FIG. 16 illustrates an overlapping raster based banding prevention effect.

FIG. 18 illustrates the dot printing scheme according to the first comparative example.

FIG. 20 illustrates the dot printing scheme according to the third comparative example.

FIG. 23 illustrates the dot printing scheme according to the fourth comparative example.

FIG. 24 illustrates the dot printing scheme according to the fourth comparative example.

FIGS. 25(A)–(C) illustrate an example of a combination of printing scheme parameters that enables printing of L=1 to 3 at k=6.

FIGS. 26(A)–26(C) illustrates an example of a combination of printing scheme parameters that enables printing of L=1, 2 at k=4.

FIG. 30 is an enlarged view of dots formed in a first main scanning pass using the conventional technology.

FIG. 31, is an enlarged view of dots formed up to the second main scanning pass using the conventional technology.

DESCRIPTION OF THE PREFERRED EMBODIMENT

A. Configuration of Apparatus

Figure 1:
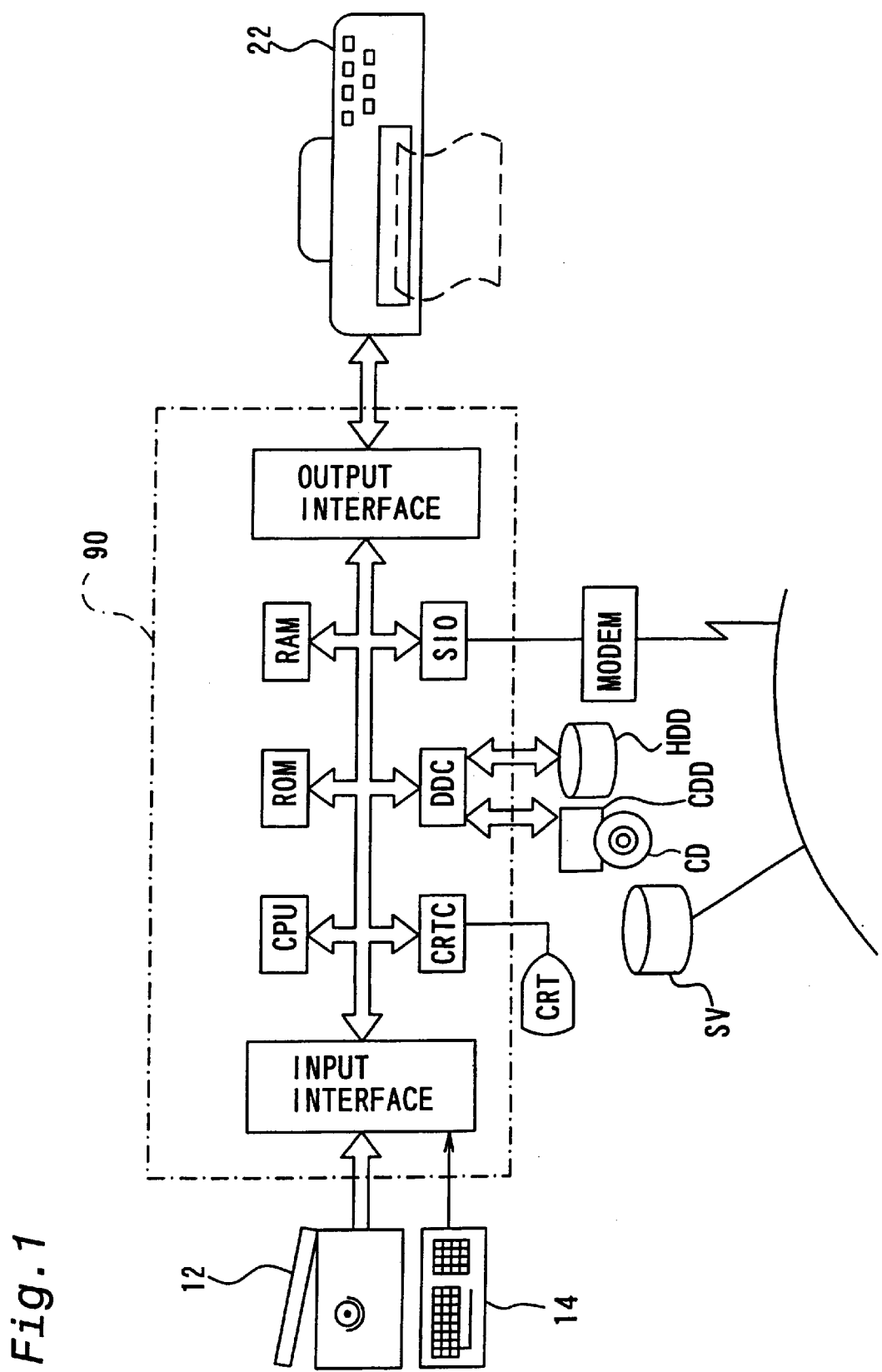
FIG. 1 is a diagram showing the configuration of an image processing system having a printer according to an embodiment of the present invention.

FIG. 1 is a block diagram of a computer system having a printing apparatus according to an embodiment of the present invention. As shown, a scanner 12 and color printer 22 are connected to a computer 90. The computer 90 is equipped with CPU 81 that in accordance with a program processes data that is output to the color printer 22. The computer 90 includes various units, centering on CPU 81, that are connected to each other by a bus 80. Programs and data required for the various processing operations of the CPU 81 are stored in ROM 82. RAM 83 is used to temporarily store programs and data required for various processing operations of the CPU 81.

Signals from the scanner 12 and keyboard 14 enter via input interface 84, and data is output to the printer 22 via output interface 85. CRT Controller (CRTC) 86 controls the output of signals to CRT 21 that has color display capability. A disk controller (DDC) 87 controls the movement of data to and from a hard disk 16, CD-ROM drive 15 and/or a flexible disk drive, not shown. The hard disk 16 contains programs and device drivers that are loaded into the RAM 83 for execution.

Also connected to the bus 80 is a serial input/output interface (SIO) 88. The SIO 88 is connected to a public phone line PNT via a modem 18. Thus, the computer 90 is connected to an external network via the SIO 88 and modem 18, and can therefore be connected to a server SV to allow the downloading to the hard disk 16 of programs required for the processing of image data. The computer 90 can also be operated by loading the necessary programs from a CD-ROM or flexible disk.

The software configuration of the printer 22 shown in FIG. 2 will now be explained. The printer 22 has the following functional blocks: an input receiver 1, a rasterizer 2, a main scan controller 6, and a sub-scan controller 7. The rasterizer 2 has a nozzle grouper 3, a raster data setter 4 and an overlap data setter 5. These functional blocks perform the following processes at the respective prescribed timing.

The input receiver 1 handles the data input into the printer 22. Input includes print image data for the printing, and printing conditions. Printing conditions refer to data specifying the printing paper, resolution and mode. In accordance with the printing conditions, data thus input is passed to the raster data setter 4 and overlap data setter 5. The raster data setter 4 rearranges the print image data into the order in which it will be used in forming dots on each raster line by the nozzles of the printer 22. The overlap data setter 5 rearranges the print image data into the order in which the dots will be formed by each nozzle, with respect to the raster lines which are printed by the overlap scheme. The overlap scheme refers to a printing method in which, with respect to each ink color, dot printing on a raster line are completed by two or more main scan passes. In a two-pass raster formation, for example, the odd pixels are printed during the first pass and the even pixels during the second pass. Therefore, after the overlap data setter 5 has rearranged the print image data into the order in which the dots will be formed by the nozzles, data corresponding to the even or odd pixels which are not to be printed is converted into mask data specifying where dot printing is not to be excuted.

A "non-overlap scheme", on the contrary, refers to a scheme in which dot printing for each color on a raster line is completed during a single main scanning pass. A "partial overlap scheme" refers to a scheme of printing that is a combination of the overlap and non-overlap schemes, wherein some raster lines are printed by the overlap scheme and other raster lines by the non-overlap scheme.

The nozzle grouper 3 designates which nozzle is used to print a raster line by the overlap scheme. This designation is based on printing conditions input by the input receiver 1 and on the positions of the raster lines to be printed during the next main scan pass. The positions of the raster lines to be printed by the next main scan pass are received from the sub-scan controller 7. The printing data for each nozzle is set by the raster data setter 4 and overlap data setter 5, in accordance with the designation by the nozzle grouper 3.

The data set by the raster data setter 4 and overlap data setter 5 is passed to the main scan controller 6. The main scan controller 6 effects the main scan pass by moving the print head while forming dots in response to the received data. Thus, the main scan controller 6 has part of the function of a main scan driver and a head driver. When the sub-scan controller 7 receives a signal from the main scan controller 6 signaling the completion of the main scan pass, the sub-scan controller 7 implements a sub-scanof a prescribed amount. The sub-scan amount is set based on the printing conditions input via the input receiver 1.

Figure 3:
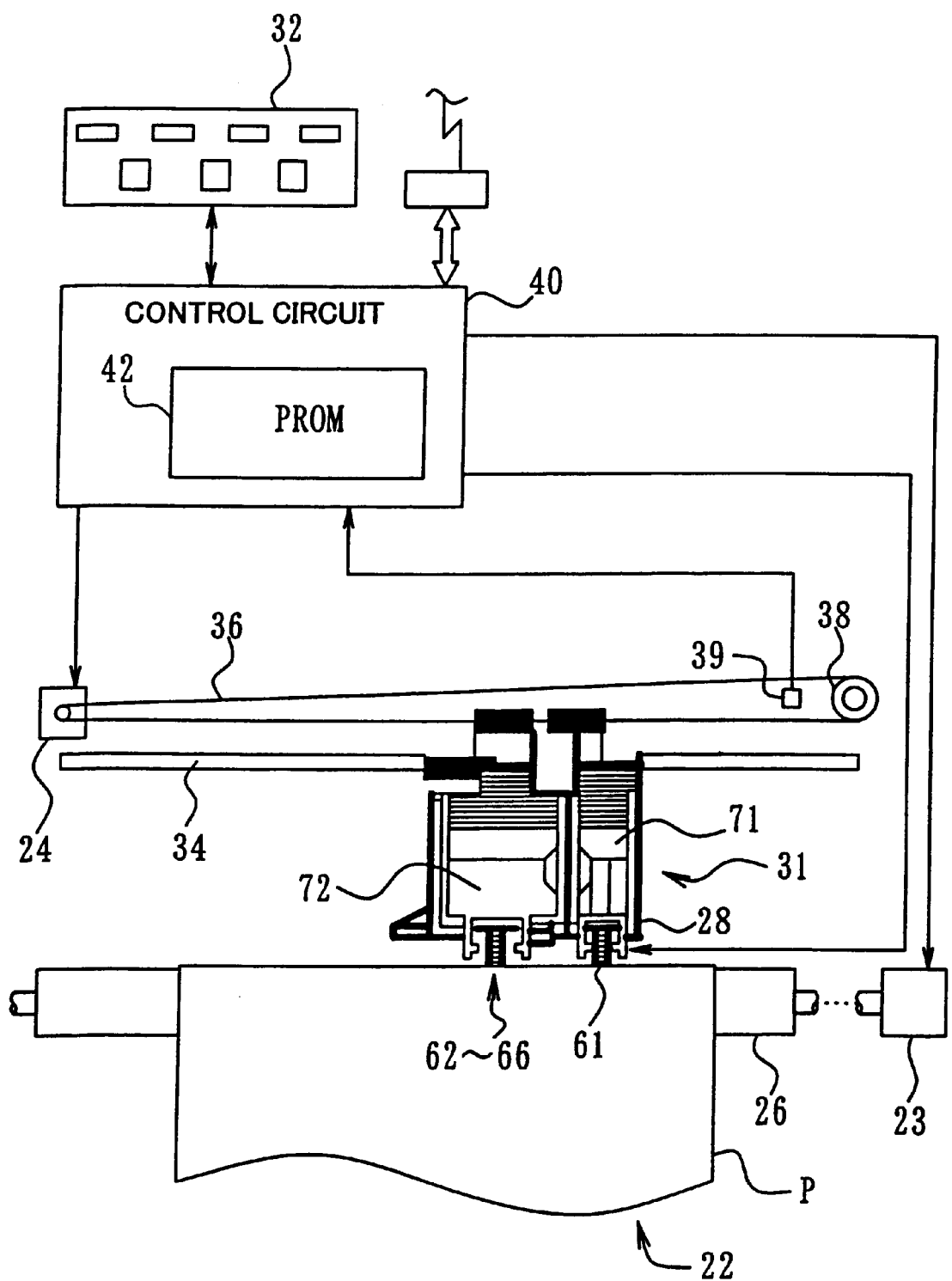
FIG. 3 shows the configuration of an embodiment of the printer.

The configuration of the printer 22 shown in FIG. 3 will now be described. As shown, the printer 22 comprises: a paper feed mechanism including a feed motor 23 for feeding paper P; a main scan mechanism including a carriage motor 24 for effecting reciprocal motion of a carriage 31 in the axial direction of platen 26; a head driving mechanism for driving a print head 28 mounted on the carriage 31 to control ink emission and dot printing; and a control circuit 40 for controlling the mechanisms and handling to and from the control panel 32.

In addition to the platen 26 rotated by the feed motor 23, the paper feed mechanism includes a gear train (not shown) that transmits the motor rotation to the paper feed rollers. The main scan mechanism includes a slide-shaft 34, disposed parallel to the axis of the platen 26, on which the carriage 31 is slidably supported, a pulley 38 that tensions an endless drive belt 36 running between the pulley 38 and the carriage motor 24, and a position sensor 39 for detecting a reference position of the carriage 31.

The carriage 31 can be equipped with a black-ink (K) cartridge 71 and a colored-ink cartridge containing ink of the five colors: cyan (C), light cyan (LC), magenta (M), light magenta (LM) and yellow (Y). Cyan and magenta are provided in two shades. The print head 28 beneath the carriage 31 has six inkjet heads 61 to 66. The bottom of the carriage 31 is provided with ink channels 68 through which the inks in the cartridge ink tanks are supplied to each head.

Figure 4A:
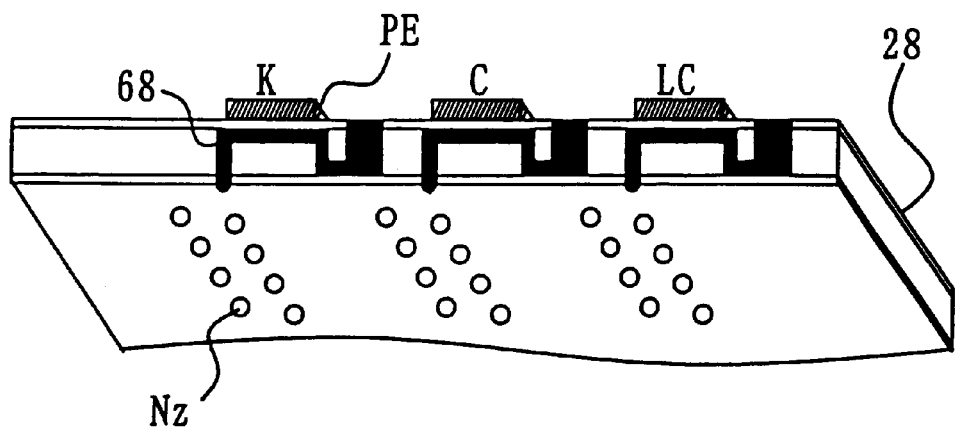
FIGS. 4(a) and 4(b) illustrate the dot printing mechasnism of the printer embodiment.
Figure 4B:
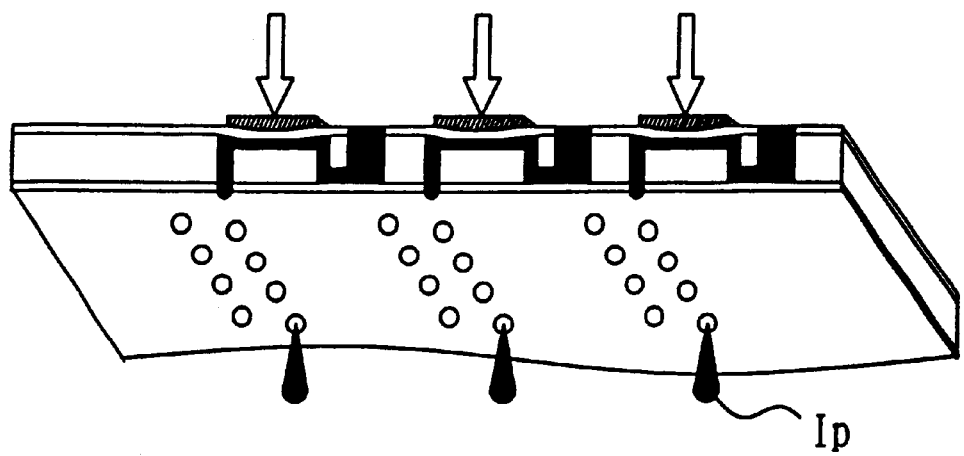
Figure 5:
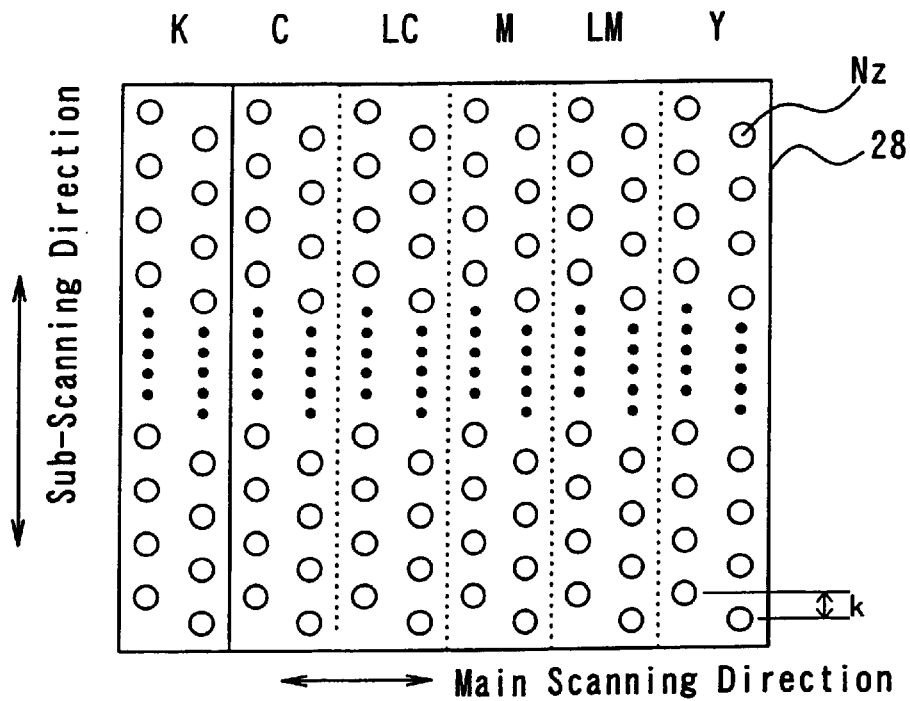
FIG. 5 illustrates the nozzle arrangement in the printer embodiment.

FIGS. 4(a) and 4(b) shows the internal configuration of the inkjet print head 28. For the purpose of illustration, the drawing shows just the portion from which black ink (C), cyan (C) and light cyan (LC) are emitted. In actuality, there are the six heads 61 to 66, one for each color, as shown in FIG. 5. When the ink cartridges 71 and 72 are fitted into place on the carriage 31, the inks of each color are supplied to the heads 61 to 66 via the ink channels.

The inkjet heads 61 to 66 are each provided with a plurality of nozzles Nz, and as shown in FIG. 4(a), each nozzle has a piezoelectric element PE having good response characteristics. As known, applying an electrical charge to a piezoelectric element produces a distortion of the crystalline structure that can be used to convert electrical to mechanical energy at very high speeds. In this embodiment, when a voltage of prescribed duration is applied across the electrodes of the piezoelectric element PE, the piezoelectric element PE expands in the direction indicated by the arrows shown in FIG. 4(b) for the duration of the said voltage application. This deforms a wall of the ink channel 68, reducing the volume of the ink channel 68 by an amount corresponding to the expansion of the piezoelectric element PE, thereby expelling a corresponding amount of ink in the form of a droplet Ip that is emitted at high speed from the nozzle Nz. Printing is effected by these ink droplet Ip soaking into the paper P on the platen 26.

FIG. 5 is a drawing illustrating the arrangement of the inkjet nozzles Nz of the heads 61 to 66. The nozzles are grouped into six arrays according to color, each including 48 nozzles arranged in a zigzag formation at a set pitch k in the sub-scanning direction. The nozzles of each array have the same positions in the sub-scanning direction. The nozzles Nz do not have to be arranged in a zigzag formation, and may instead be arranged in a straight line. However, with respect to the manufacturing process, the zigzag arrangement shown in FIG. 5 has the advantage of making it easier to reduce the nozzle pitch k.

The nozzle arrays are arranged in the main scanning direction in the order of black (K), cyan (C), light cyan (LC), magenta (M), light magenta (LM) and yellow (Y). As such, when the head of the printer 22 is moving to the right with reference to FIG. 5, ink is emitted in the order Y→LM→M→LC→C→K on a particular pixel, and when the head is moving to the left the inks are emitted in the reverse order. The difference between the order in which ink is jetted onto the paper during the forward and reverse passes results in a slight difference in the hue between dots produced on a forward pass and those produced on a reverse pass, even when ink of each color is provided at a set ratio.

Figure 6:
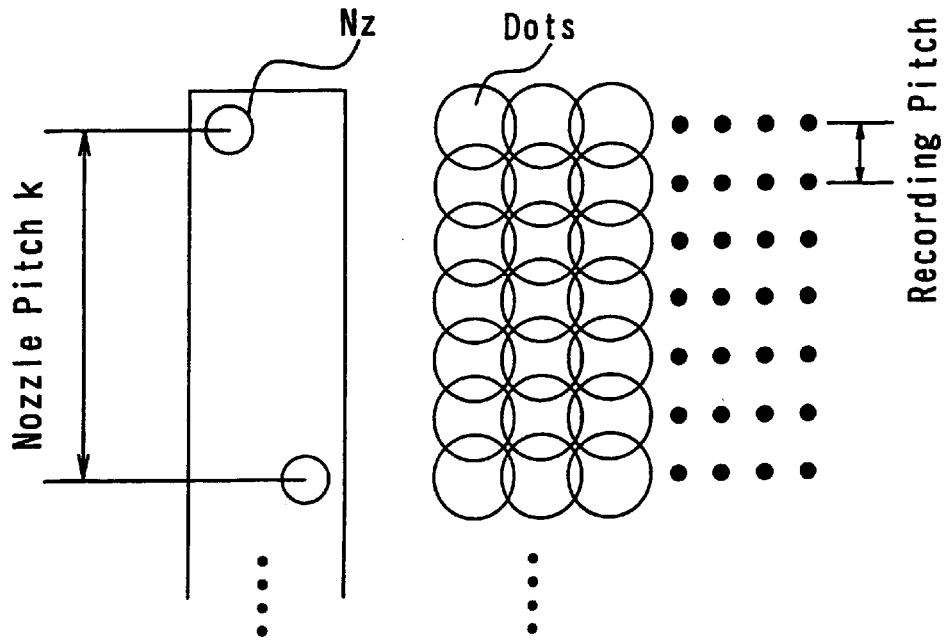
FIG. 6 shows an enlargement of the nozzle arrangement of the printer, and the relationship with the dots formed.

FIG. 6 shows an enlarged view of a nozzle array, and of dots formed by the nozzle array. As shown by FIG. 6, in this embodiment five raster lines can be printed between adjacent nozzles on the head. To prevent any dot voids, dots are formed so that they partially overlap adjacent dots in the main and sub-scanning directions.

Figure 7:
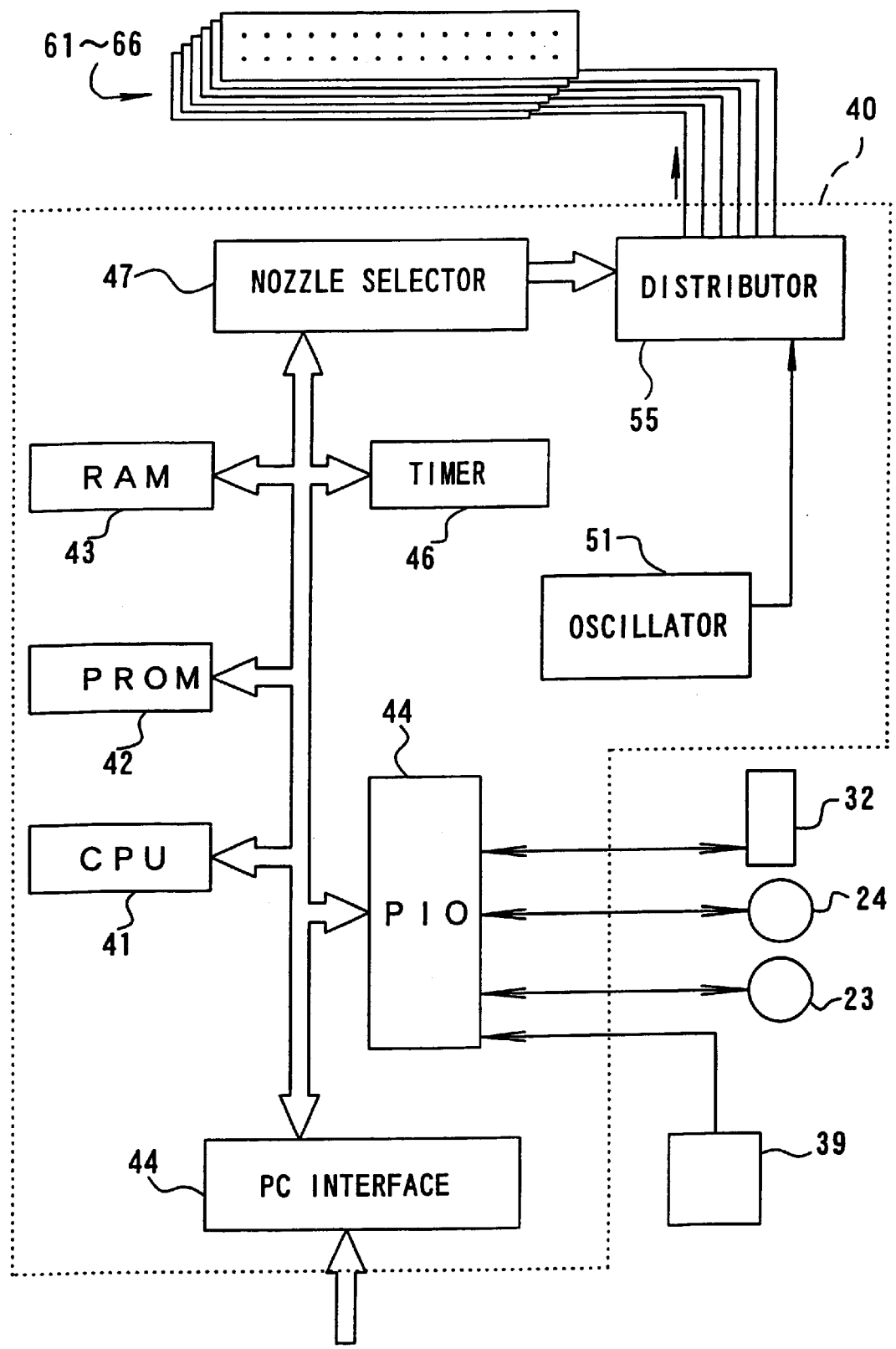
FIG. 7 shows the internal configuration of a printer controller.

The internal configuration of the control circuit 40 of the printer 22 will now be described. FIG. 7 shows the internal arrangement of the control circuit 40. As shown in FIG. 7, in addition to CPU 41, PROM 42 and RAM 43, the control circuit 40 is provided with PC interface 44 for exchanging data with the computer 90, a peripheral input/output interface (PIO) 45 for communication of signals among the feed motor 23, the carriage motor 24 and the control panel 32, a timer 46, and a nozzle selector 47 that outputs dot on/off signals to the heads 61 to 66. These elements and circuits are connected to each other by a bus 48. The control circuit 40 is further provided with an oscillator 51 that outputs a head drive signal waveform of a prescribed frequency, and a distributor 55 that distributes the output from the oscillator 51 to the heads 61 to 66 at a prescribed timing. The control circuit 40 receives dot data, or print image data, processed by the computer 90, stores it temporarily in the RAM 43 and outputs it at a prescribed timing to the nozzle selector 47.

The nozzle selector 47 holds data specifying formation (On) or nonformation (Off) of dots by each nozzle. When the On/Off signal data for all nozzles is stored in the nozzle selector 47, a drive signal waveform is output to each head from the distributor 55. Nozzles supplied with an On signal from the nozzle selector 47 emit ink in response to the drive signal waveform according to the mechanism described with reference to FIGS. 4(a) and 4(b).

As shown in FIG. 5, the heads 61 to 66 are arrayed in the direction of transport by the carriage 31, so that the nozzles of each array reach the same point on the paper P at a different timing. Taking this positional offset of the nozzles of the heads 61 to 66 into account, the CPU 41 outputs dot On/Off signals at the requisite timing via the nozzle selector 47 to thereby form the dots of each color. The arrangement of the nozzles of heads 61 to 66 in two rows as shown in FIG. 6 is also taken into account in controlling the output of the On/Off signals.

Figure 2:
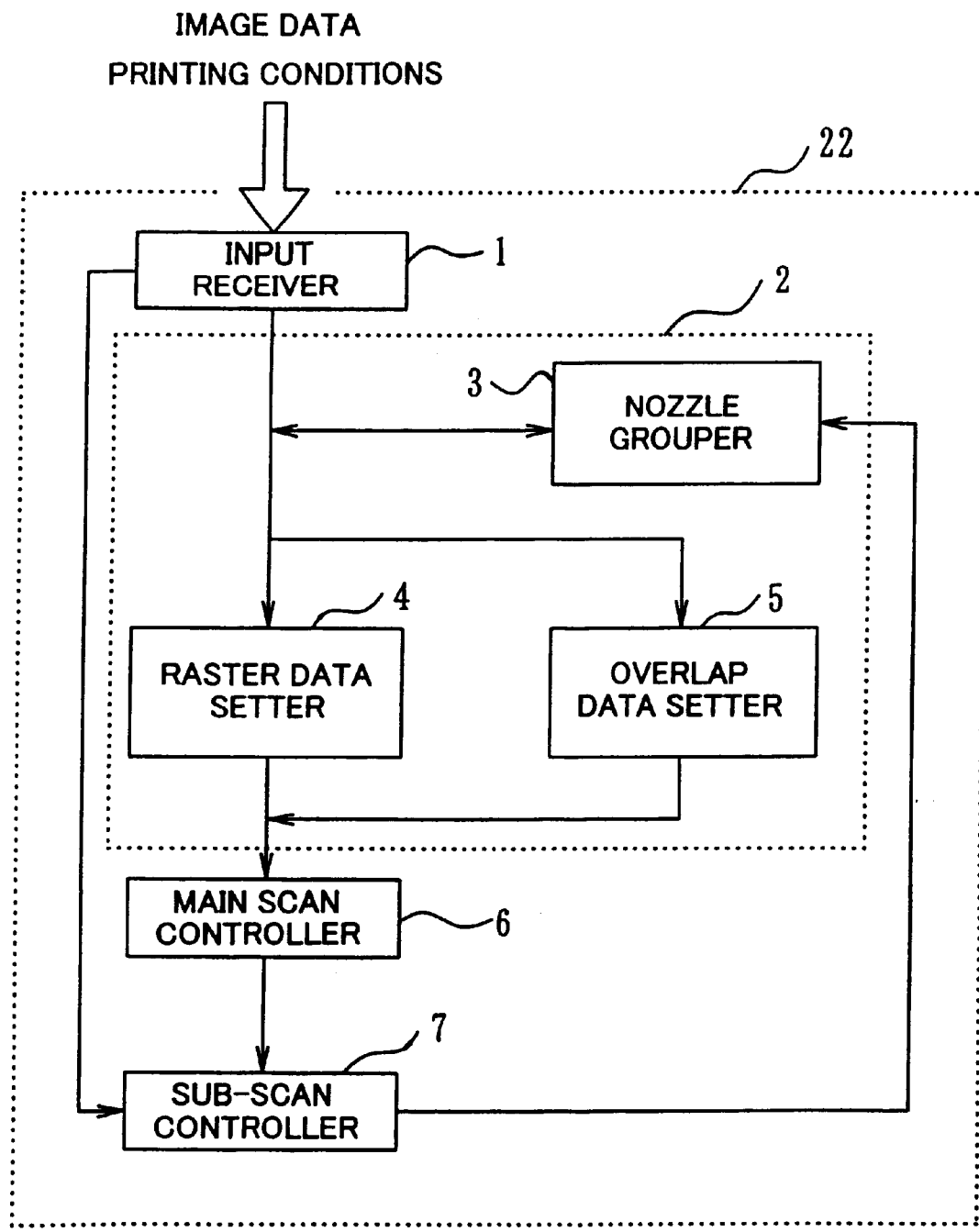
FIG. 2 is a diagram illustrating the software configuration of an embodiment of the printer.

The functions of each of the blocks shown in FIG. 2 are implemented by the CPU 41 executing the programs stored in the RAM 43. In this embodiment the functions of the nozzle driver of the present invention are implemented by the rasterizer 2 and main scan controller 6 shown in FIG. 2 and the nozzle selector 47 and distributor 55 shown in FIG. 7.

In printing, the feed motor 23 rotates the platen 26 and other rollers to feed the paper P to effect sub-scan and the carriage motor 24 reciprocates the carriage 31 to effect main scan, and at the same time the piezoelectric elements of the inkjet heads 61 to 66 of the print head 28 are driven to emit the inks of the various colors to thereby form multicolored images on the printing paper P.

Although this embodiment is described with reference to a printer 22 equipped with heads that use piezoelectric elements PE to emit ink, a printer may be used that emits ink by another mechanism. For example, the ink channel may be provided with a heater that when electrically energized generates bubbles in the ink channel that cause the ink to be emitted.

B. First and Second Embodiments

Figure 8:
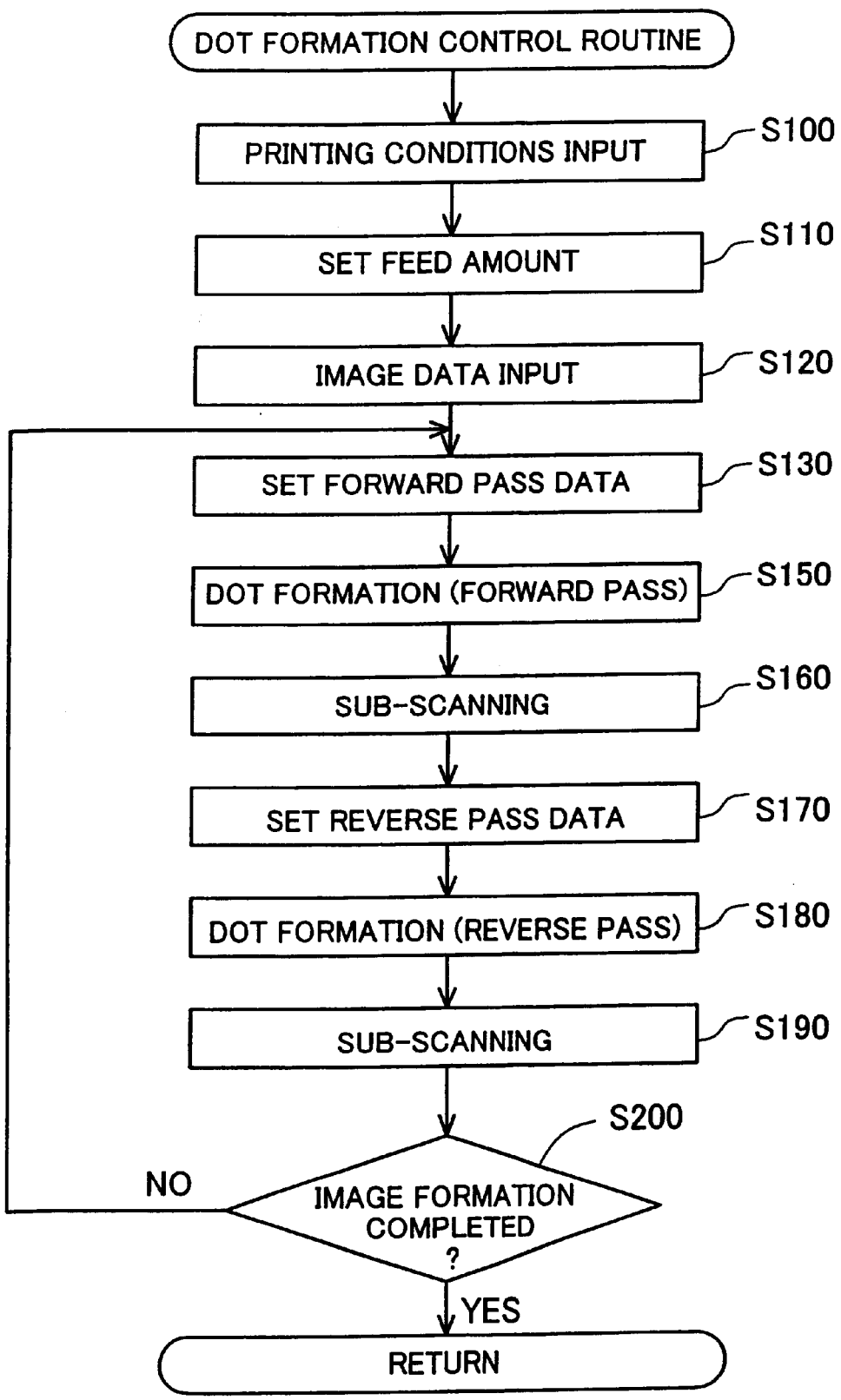
FIG. 8 is a flow chart of the dot printing control routine used in the embodiment of the invention.
Figure 9:
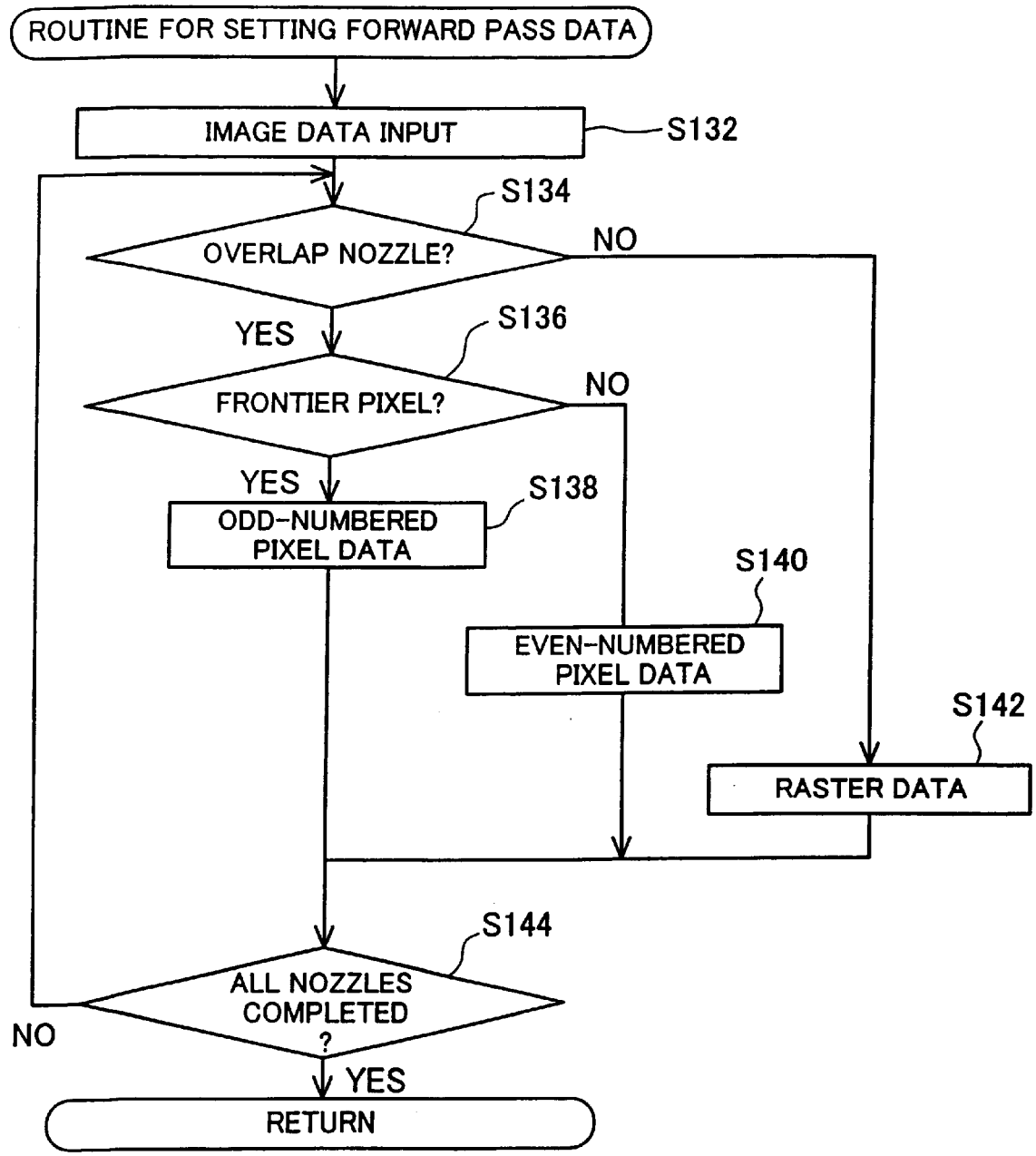
FIG. 9 is a flow chart of the routine used to set the data for a forward pass.
Figure 10:
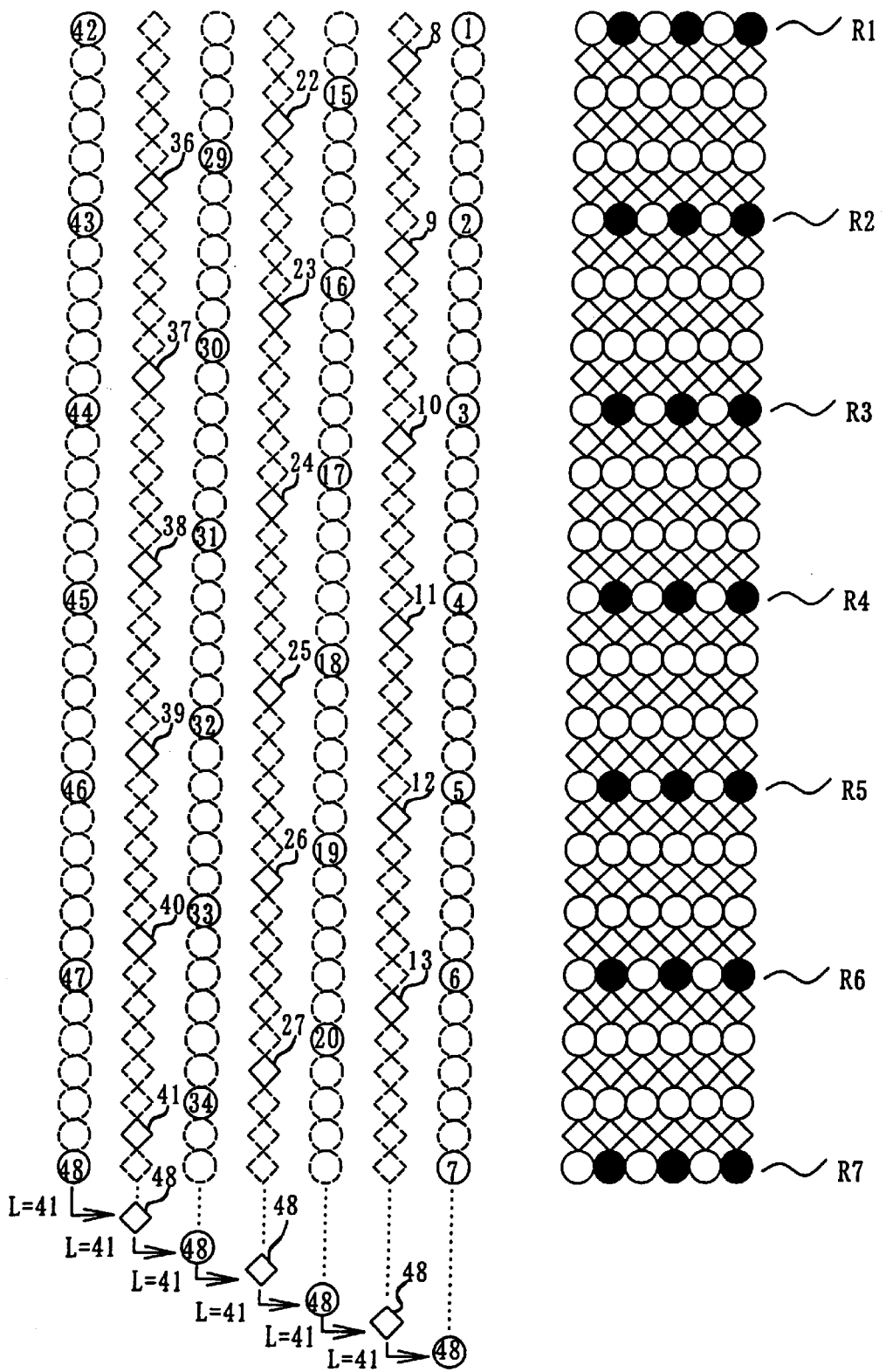
FIG. 10 illustrates dot printing in bidirectional printing in a first embodiment of the invention.

Printing of images by a printer 22 according to a first embodiment of the present invention will now be described. FIGS. 8 and 9 are flow charts of the procedure for controlling main and sub-scanning in accordance with this embodiment. This process is executed by the CPU 41 of the control circuit 40 shown in FIG. 7. FIG. 10 shows the dots formed in accordance with this process.

For convenience, first the content of FIG. 10 will be explained. As described with reference to FIG. 5, the head of the printer 22 is equipped with 48 nozzles for each color. The round and diamond shaped symbols numbered 1 to 48 shown on the left in FIG. 10 show the position of each nozzle in the sub-scanning direction. The ordinal numbers of the nozzles are assigned to the circles and diamonds. The circles indicate nozzle positions during a forward pass of the carriage 31, while the diamond shapes indicate nozzle positions during a reverse pass. For the purpose of facilitating the illustration, FIG. 10 shows only a portion of the 48 nozzles used in the printing. The rows of nozzles, from the first row, starting on the left, to the seventh row, are shown in positions corresponding to seven main scan passes.

At the right-hand side of FIG. 10 are shown the dots printed by the above scanning of the print head. The circle and diamond symbols signify the dots formed during the forward and reverse passes, respectively, of the print head.

Although a diamond shape is used to indicate a position of a nozzle or dot, the nozzles and dots are actually substantially round in shape, the diamond shape being used just to readily differentiate the positions of dots. This also applies hereinbelow with respect to descriptions of other drawings.

The dot printing control routine of FIG. 8 will now be explained, with reference to FIG. 10. Upon starting the dot printing control routine, the CPU 41 inputs printing conditions (step S100). Printing conditions include type of paper, print resolution and printing mode. In the case of this embodiment a selection is made between plain paper and special paper that inhibits the bleeding of the ink. A choice may be made between print resolutions of 720 dpi (dots per inch) and 360 dpi. Print modes include unidirectional printing and bidirectional printing. Unidirectional mode refers to printing only during the forward pass of the carriage 31, while bidirectional mode refers to printing during both the forward and reverse passes by the carriage 31.

Next, the CPU 41 sets the amount of sub-scan feed (step S110). This feed amount is set in accordance with the printing conditions. In this embodiment the PROM 42 is used to prestore a table that provides the sub-scan feed amount for each permissible combination of printing conditions, allowing the sub-scan feed amount to be set by referring to the table. For example, when the sub-scan feed amount is equal to 41 dots as shown in FIG. 10, partial overlap printing is executed to form overlap raster lines R1 to R7 intermittently. The sub-scan feed amount is determined based on the ratio of overlap raster lines. The ratio of overlap raster lines is set according to the printing conditions, taking into account both image quality and printing speed. Details of setting the sub-scan feed amount according to the printing conditions are described later.

Next, image data is input into the RAM 43 by CPU 41 (step S120). This image data is supplied by the computer 90 and specifies the positions where the dots of each color are to be formed. In this embodiment, all of the data relating to images to be printed is input in step S120. The data may also be input sequentially while forming dots as described below.

Next, the CPU 41 produces the data used for dot printing during the forward pass (step S150). The details of this process will be explained with reference to the flow chart of FIG. 9. The routine for setting data for the forward pass starts with the input of the image data (step S132). This image data is that portion of the data input in step S120 of FIG. 8 corresponding to the raster lines to be printed by the next main scan. In this embodiment, since the print head is equipped with 48 nozzles for each color, data corresponding to 48 raster lines is input. When the image data is input, the following process is repeated for each nozzle to set the forward pass data.

First, it is determined whether or not the nozzle for which the forward pass data is being set is an overlap nozzle (step S134). By overlap nozzle is meant a nozzle used to print an overlap raster line, as in the case of raster line R1 in FIG. 10. If the nozzle is not an overlap nozzle, the raster data is set as the data for that nozzle (step S142). Raster data refers to the data indicative of On/Off of all the pixels on a raster line. The nozzle can print the entirety of one raster line in response to the raster data during a single forward pass. When overlap printing is not applied to any raster lines, raster data is set for all of the nozzles.

Figure 29:
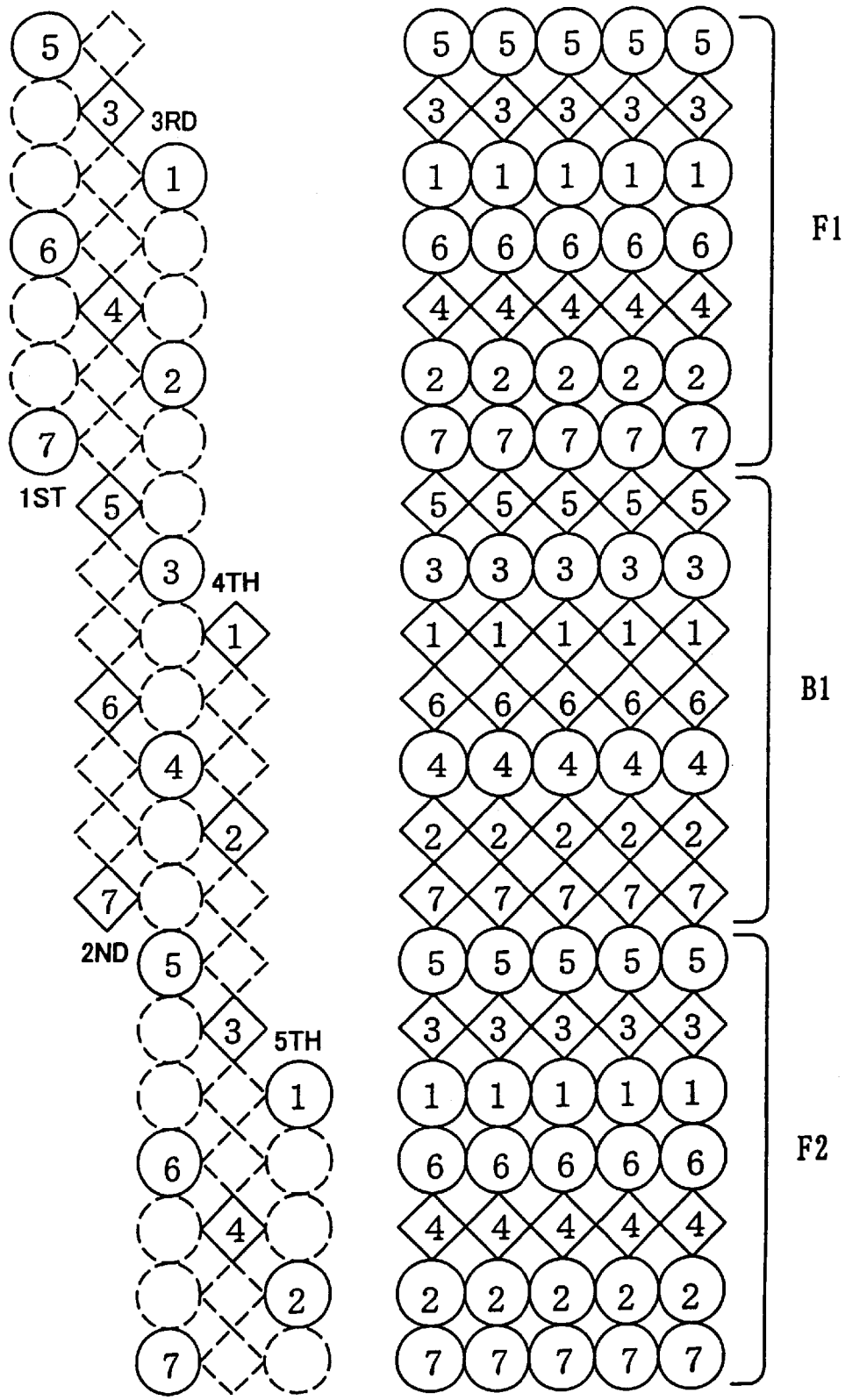
FIG. 29 illustrates dot printing using conventional bidirectional printing technology.

When the nozzle is an overlap nozzle, the CPU 41 determines whether or not the pixels which are subject to the dot printing by the nozzle are forefront pixels (step S136). A forefront pixel is one by which the printed region is extended in the sub-scanning direction from the region printed up to the previous pass. In this specification, the forefront pixel is also referred to as a new target dot printing location or a dot location on a first type of target main scanning line. Specifically, in the first main scanning pass shown in FIG. 10, pixels formed by nozzles No. 42 to No. 48 correspond forefront pixels. In the prior art example of FIG. 29, the pixels formed by nozzles No. 5 to No. 7 during each main scanning pass correspond to forefront pixels.

If it is judged that the pixels concerned are forefront pixels, the CPU 41 sets the nozzle data with odd-numbered pixel data (step S138). Odd-numbered pixel data is produced by rearranging print data for all the pixels on a raster line into the order of dot printing during the next pass and converting the print data at the even-numbered pixels into masking data or Off data. Nozzles for which this data has been set are able to print the odd-numbered pixel dots along a raster line during a single forward pass of the carriage 31. In the example of FIG. 10, odd-numbered pixel data is set for nozzles No. 42 to No. 48 during the first main scanning pass. As shown in FIG. 10, these nozzles form the odd-numbered pixels of raster lines R1 to R7, that is, the dots of the pixels indicated by open circles.

If it is determined that the pixels concerned are not forefront pixels in step S138, that is, if dot printing has been executed at some pixels on the same raster line in preceding passes, the CPU 41 sets the nozzle data with even-numbered pixel data (step S140). Even-numbered pixel data is produced by rearranging print data for all the pixels on a raster line into the order of dot printing during the next pass and converting the print data at the odd-numbered pixels into masking data or Off data. Nozzles for which this data has been set are able to print the even-numbered pixels along a raster during a single forward pass of the carriage 31. In the example of FIG. 10, even-numbered pixel data is set for nozzles No. 1 to No. 7 during the seventh main scanning pass. As shown in FIG. 10, these nozzles form the even-numbered pixels of raster lines R1 to R7, that is, the dots of the pixels shown by solid circles.

Setting of printing data, or dot printing data, for one nozzle is complete in accordance with the above process. The CPU 41 repeats the some process to set the printing data for all of the 48 nozzles for each color ink (step S144). When forward pass data has been set for all nozzles, the scheme returns to the dot printing control routine of FIG. 8 to execute the next process.

After the dot printing data for the forward pass has thus been set, the CPU 41 starts the dot printing (step S150). Specifically, the printing data set in step S130 is sent to the nozzle selector 47 shown in FIG. 7. Then, the carriage motor 24 is controlled to effect main scanning by moving the print head while a drive waveform is output. In the first main scanning pass, the dot printing is executed at the positions shown by the open circles on the raster lines R1 to R7 in FIG. 10.

Next, the CPU 41 controls the paper feed motor 23 to effect sub-scan feed by the amount set in step S110 (step S160). The dot printing data for the reverse pass is then set (step S180). Details of this procedure are substantially the same as that of the procedure of FIG. 9. During the reverse pass the direction of movement of the carriage 31 is opposite to that during the forward pass. Consequently, the order in which the data is arranged for dot printing during the reverse pass is opposite to that used during the forward pass. That is the only difference from the data setting procedure used for the forward pass.

After the dot printing data for the reverse pass has thus been set, the CPU 41 executes the dot printing while the head is being moved back on the reverse pass (step S180). In the example of FIG. 10, during the second main scanning pass overlapping is not applied to the raster lines formed by nozzles No. 36 to No. 41. Therefore, all the dots on these raster lines are formed by the main scanning pass of step S180. During the second main scanning pass dots are also formed by nozzles No. 42 to No. 48, but illustration of this is omitted.

Next, the CPU 41 controls the paper feed motor 23 to effect sub-scan feed by the amount set in step S110 (step S190). In the example of FIG. 10, the amount of the sub-scan feed is equal to 41 dots. The above process is repeated until formation of the image has been completed (step S200). Image formation by the above procedure can also be effected using a print head equipped with another number of nozzles than the 48 of this embodiment.

The image shown on the right-hand side of FIG. 10 can be printed by repeating the procedure described above. Of the raster lines shown in FIG. 10, the overlap scheme is applied to the printing of the seven raster lines R1 to R7. The other raster lines are printed by the non-overlap scheme. The effect of this will now be explained with reference to FIGS. 11 and 12.

FIGS. 11 and 12 are enlarged views of a portion of the image printed using the formation process illustrated by FIG. 10. FIG. 11 shows dots formed during a first main scanning pass by nozzles No. 42 and No. 43. The hatched circles shown at the right in FIG. 11 are dots formed. For nozzles No. 42 and No. 43 to form odd-numbered pixels during the first main scanning pass, as shown, the dots are printed at separated positions in the main scanning direction. Dots thus printed exhibit little bleeding to have a proper diameter.

FIG. 12 shows dots formed during a second main scanning pass by nozzle No. 36. The hatched diamonds indicate the positions of the dots formed during the second main scanning pass. Since all the pixels on each raster are subject to dot printing during the second main scanning pass, the dots overlap in the main scanning direction.

The dots formed during the second main scanning pass also overlap dots formed during the first main scanning pass. However, because the dots formed during the first main scanning pass do not bleed much and are therefore formed to have a proper diameter, the area of the overlap portion is relatively small. It is known that when dots of a similar hue are overlapped, the hue of the dots formed first becomes predominant. In the printing apparatus of this embodiment, as shown by FIGS. 10 to 12, the ratio of the overlapping portion can be reduced by applying partially overlapping printing, thereby inhibiting the dominant manifestation of the hue of the dots formed first.

The prior art examples of FIGS. 30 and 31 will now be compared. In printing using the non-overlap scheme, all the pixels on a raster line are subject to dot printing when the dot printing is executed on the raster line for the first time. The result is that, as shown in FIG. 30, adjacent dots are overlapped before they are dry. Such dots are therefore prone to bleeding and tend to have a diameter that is slightly larger than the proper diameter. When this is the state when the second main scanning pass takes place, the result is, as shown in FIG. 31, the portion that overlaps the dots formed during the first main scanning pass increases in size. The result is an increase in the size of region that manifests the predominant hue of the dots formed during the first main scanning pass.

Thus, the region of the dominant hue of the dots formed first is related to bleeding of the dots. The degree of bleeding depends on the printing conditions. In the case of the printer of this embodiment, this bleeding is reduced by adjusting the number of raster lines to which overlapping is applied, in accordance with the printing conditions.

Let us, for example, assume that the image shown in FIG. 10 is printed on a paper that is relatively prone to bleeding. As explained with reference to FIG. 12, dots are formed during the first main scanning pass with a space between adjacent dots, but during the second main scanning pass the dots are formed with an overlap. With paper which is relatively prone to bleeding, the bleeding will cause an enlargement of dots formed during the second main scanning pass. The result will be to increase the size of the region having the hue of the dots formed during the second main scanning pass, which can cause color non-uniformity.

Figure 13:
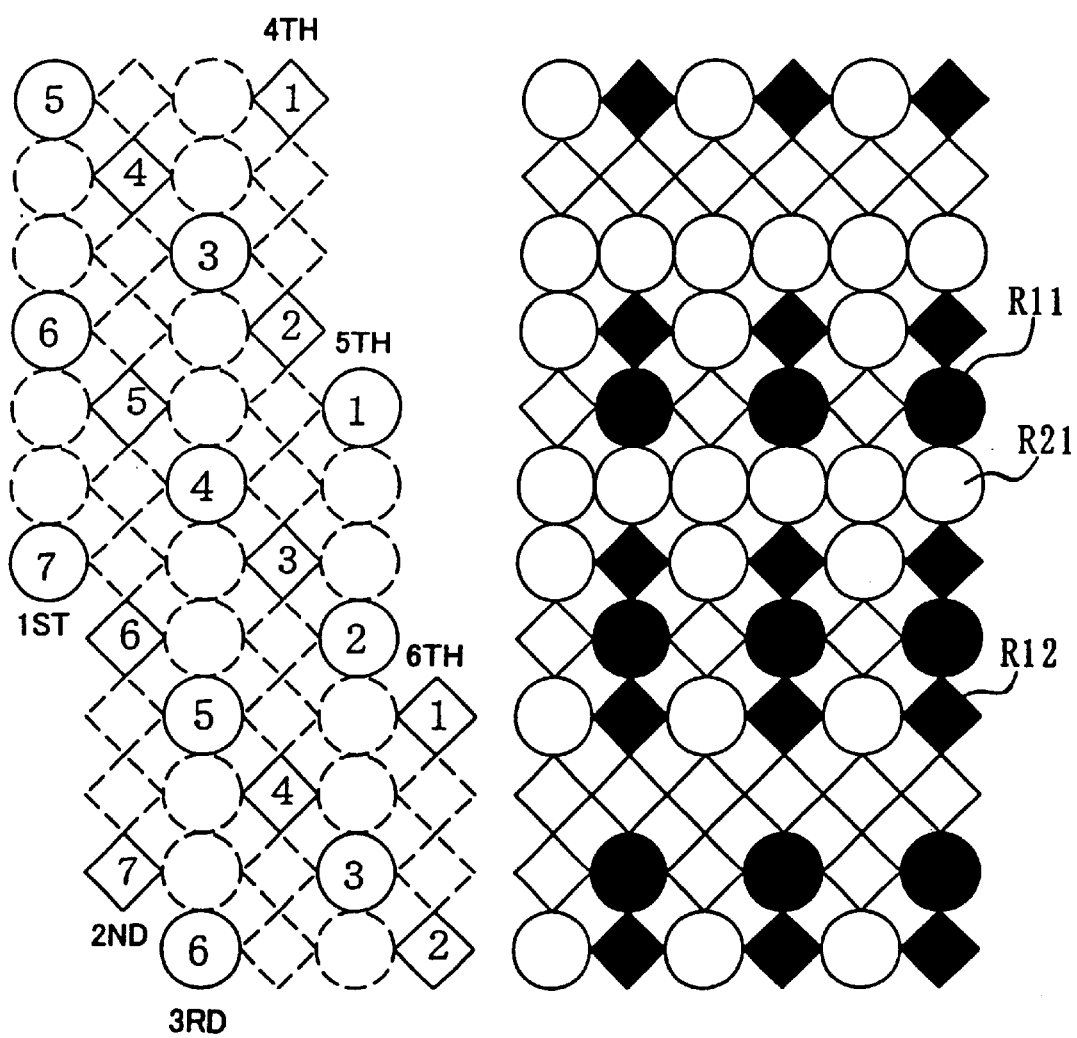
FIG. 13 illustrates dot printing in bidirectional printing in a second embodiment of the invention.

In this case, it is preferable to apply the overlap printing to the raster lines formed during the second main scanning pass. FIG. 13 illustrates an example of a second embodiment using overlapping of raster lines formed during the second main scanning pass. For convenience, this example is shown with reference to a print head equipped with seven nozzles arrayed in the sub-scanning direction. The nozzles are arranged at a spacing that enables two raster lines to be present between adjacent nozzles. In other words, the nozzles are arranged at a three-dot pitch in the sub-scanning direction. The raster lines formed by nozzles No. 5 to No. 7 of FIG. 13 correspond to initial dot printing raster lines, or the raster line where the dots are formed for the first time. Overlap printing is applied to these raster lines.

The raster lines formed by nozzles No. 6 and No. 7 also correspond to the initial dot printing raster line during the second main scanning pass. Overlap printing is also applied to the printing of these raster lines. Because the raster line R11 formed by No. 5 nozzle during the second main scanning pass is formed between the raster lines formed by nozzles No. 6 and No. 7 during the first main scanning pass, it is not a initial dot printing raster line. In the example of FIG. 13, raster line R11, positioned between the initial dot printing raster lines, is also printed by the overlap scheme. This makes it possible to inhibit the hues of dots formed during the second main scanning pass from showing up as the predominating hues. In the same way, overlapping is also applied to the printing of raster line R12 formed during the third main scanning pass by nozzle No. 5.

In the example of FIG. 13, the overlap scheme is not applied to raster line R21 formed during the third main scanning pass by nozzle No. 4. This is because, for the reasons explained below, the overlap scheme is not necessary to maintain color uniformity on the raster line R21. When dot printing is executed on the raster line R21, the dots of the adjacent raster lines above and below are already formed. The dots on the raster line R21 are formed on these existing dots to overlap. Regardless of whether or not the dots on the raster line R21 bleed, the region in which the hue of these dots predominates is extremely small. Consequently, as far as color non-uniformity is concerned, the effect of applying the overlap scheme to the raster line R21 is small. Moreover, applying the non-overlap scheme to the raster line R21 can increase the printing speed.

Even using the nozzles of the first embodiment, the overlap scheme as shown in FIG. 13 can also be applied to raster lines located between the initial dot printing raster lines. In the case of the first embodiment five raster lines can be present between adjacent nozzles. Therefore, if required by the printing conditions, the overlap scheme can be applied to up to four of the five raster lines between adjacent nozzles.

The number of raster lines to which the overlap scheme is applied varies depending on the paper used and on the print resolution, meaning the dot pitch on the paper. Here we compare a first case using a relatively low print resolution with a large space between the initial dot printing raster lines, and a second case using a relatively high resolution with a small space between the initial dot printing raster lines. When bleeding occurs on the initial dot printing raster lines, the adverse effect on color uniformity is greater in the second case. Let it be assumed that FIG. 11 corresponds to the first case and FIG. 30 to the second case, and that in both cases there is about the same amount of bleeding. In the case of the low print resolution (FIG. 11), the larger space between the initial dot printing raster lines means that even if bleeding does occur, there remains between the raster lines a relatively large region in which the hue of the dots first formed does not predominate. In contrast, in the case of the high print resolution (FIG. 30), the small space between the initial dot printing raster lines means that when bleeding occurs, almost no region is left in which the hue of the initially formed dots is not predominant. Thus, from the standpoint of color non-uniformity, in the case of low-resolution printing it does not matter if the number of raster lines to which the overlap scheme is applied is reduced. The printer 22 according to this embodiment can be used to produce low resolution printing by using every other of the 48 nozzles. Thus, in the example of this embodiment, when a low resolution printing mode is selected the number of overlapped raster lines can be decreased, improving the printing speed.

As described above, in order to reduce color non-uniformity the number of raster lines to which overlapping is applied is adjusted according to the printing conditions. The present embodiment includes a look-up table of appropriate overlapping rates that enable color non-uniformity to be reduced with respect to various printing conditions such as paper type and print resolution. The relationship between printing conditions and overlapping rate can be experimentally established based on the bleeding of each dot and the effect on color uniformity, taking the above-described correlation into account. When printing conditions are selected that make it most difficult for color non-uniformity to occur, there are cases in which the overlap scheme is not applied to any raster.

In accordance with the printer 22 according to the embodiment of this invention described in the foregoing, color non-uniformity arising from differences between the hues of the dots formed during a forward pass and the hues of the dots formed during a reverse pass can be reduced by applying the overlap scheme to some raster lines. Moreover, depending on the printing conditions, to reduce color non-uniformity the number of raster lines formed by the overlap scheme can be reduced to the minimum required. Thus, the application of the overlap scheme does not excessively decrease the printing speed that is a major advantage of bidirectional printing.

With the printer 22, the dot printing is completed for all the dots on each overlap raster line by two main scanning passes. Depending on the printing conditions, the number of main scanning passes required to complete dot printing of one raster line by the overlapping scheme may be increased. When printing at all dot positions is completed by two main scanning passes, as is the case with the above embodiments, a dot is formed at every other pixel. In this case, depending on the diameter of the dots and the printing conditions, there may be contact between adjacent dots, making bleeding more likely to occur. In such cases, bleeding, hence color non-uniformity, can be reduced by increasing the number of passes to at least three and forming dots spaced apart by at least two pixels in the main scanning direction.

C. Third and Fourth Embodiments

Third and fourth embodiments will now be described. In these embodiments, partial overlapping is employed using conditions that differ from those used in the first two embodiments described above. However, the same apparatus configuration and printing procedure of the first two embodiments described with reference to FIGS. 1 to 9 can also be applied to the third and fourth embodiments, so here the explanation thereof is omitted.

C-1. Basic Conditions of Sub-scan Feed with Respect to Non-overlap Scheme

Before explaining the partial overlap scheme of the third and fourth embodiments, the basic conditions of the sub-scan feed in a non-overlap scheme will be described. The conditions for the sub-scan feed in a non-overlap scheme described below can be used as a lead-in to the description of sub-scan feed conditions in a partial overlap scheme.

Figures 14A, 14B:
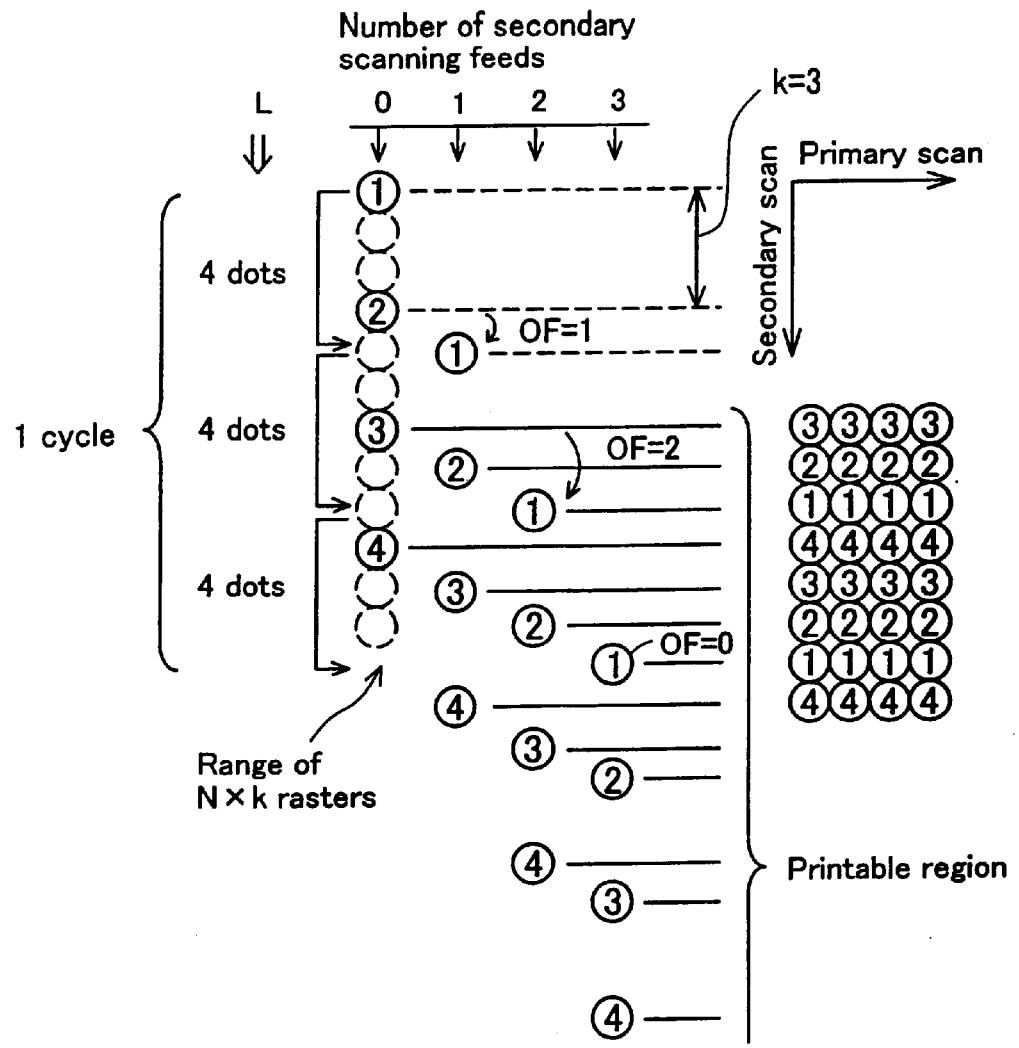
FIGS. 14(A) and 14(B) illustrate the basic conditions for sub-scan feed in a non-overlap type dot printing scheme.

FIGS. 14(A) and 14(B) are diagrams illustrating the basic conditions for the sub-scan feed in a non-overlap scheme. FIG. 14(A) is an example sub-scan feed using four nozzles, and FIG. 14(B) shows the parameters of the scheme. In FIG. 14(A), the numbers shown encircled by a solid line indicate the positions of the four nozzles in the sub-scanning direction after each has been fed in the sub-scanning direction. The circled numbers 1 to 4 are the nozzle numbers. The four nozzles are fed in the sub-scanning direction after completion of one main scanning pass. In practice, sub-scanning direction feed is effected by using the paper feed motor 23 (FIG. 3) to move the paper.

As shown at the left-hand side of FIG. 14(A), in this example the sub-scan feed amount F is set at four dots. Each time sub-scan feed is implemented, the four nozzles are moved the space of four dots in the sub-scanning direction. At the right-hand side of FIG. 14(A) are shown the numbers of the nozzles used to form the dots along each raster line.

FIG. 14(B) shows the various parameters relating to this dot printing scheme. The parameters include nozzle pitch k (in dots), the number N of nozzles used and the sub-scan feed amount F (in dots). In this example, the nozzle pitch k is three dots and the number N of nozzles used is four. This number N of nozzles used is the number of nozzles actually used out of the plurality of nozzles with which the apparatus is equipped.

The table of FIG. 14(B) shows sub-scan feed amount F, the cumulative feed value $\Sigma F$, and nozzle offset OF after each sub-scan feed. Assume here that the initial positions of the nozzles (positions located every four dots, in the case of FIG. 14(A)) are reference points of offset zero. The offset OF is a value indicating the number of dots the nozzles are from one of the reference points in the sub-scanning direction, after the nozzles have been fed in the sub-scanning direction. For example, as shown in FIG. 14(A), after the first sub-scan feed the nozzles have been moved in the sub-scanning direction by the sub-scan feed amount F (four dots). The nozzle pitch k is three dots, so after the first sub-scan feed the nozzle offset OF is 1. After the second sub-scan feed the nozzles have been moved $\Sigma F=8$ dots from their initial position, and the offset OF is 2. After the third sub-scan feed the nozzles have been moved $\Sigma F=12$ dots from their initial position and the offset OF is zero. After three sub-scan feeds the nozzle offset OF returns to zero, one cycle comprises three sub-scan passes. Thus, the dots of all the raster lines in the printable region can be formed by repeating this cycle. Here, "printable region" means the region in which dots can be formed without any raster line voids.

As will be understood from the above example, when a nozzle is at a position that is separated from its initial position by an integer multiple of the nozzle pitch k, the offset OF is zero. Offset OF is given as (ΣF)% k which denotes left over after dividing the cumulative value ΣF of the sub-scan feed amount F by the nozzle pitch k. Here, "%" is an operator indicating what remains from the division. If the initial position of the nozzle is regarded as a cyclic position, offset OF can be considered as showing the amount of phase shift of the nozzle from the initial position.

As explained below, if the following conditions C1 to C3 are satisfied, dots can be formed in the printable region without raster line voids or overlapping, regardless of whether sub-scan feed amount F is a constant value or not.

Condition C1: The number of sub-scan feed passes of one cycle equals nozzle pitch k.

Condition C2: The offset OF of a nozzle after each sub-scan feed pass of a cycle is a value that differs within the range 0 to (k−1).

Condition C3: The average sub-scan feed amount (ΣF/k) is equal to the number N of nozzles used. In other words, the cumulative value ΣF of the sub-scan feed amounts F per cycle is equal to a value (N×k) obtained by multiplying the number N of nozzles used by the nozzle pitch k.

The above conditions can be understood by thinking as follows. There are (k−1) raster lines between adjacent nozzles, so in order to form dots along (k−1) raster lines and return to the nozzle reference position (the position at which offset OF is zero) in one cycle, the number of sub-scan feed passes in one cycle will be k passes. If the number of sub-scan feed passes in one cycle is fewer than k passes, the printed raster lines will have voids. Conversely, if the number of sub-scan feed passes in one cycle is greater than k passes, there will be overlapping of raster lines. Therefore, the first condition, C1, holds.

When there are k sub-scan feed passes in one cycle, raster lines will be formed without voids or overlapping only when the offset OF following each sub-scan feed is a value that mutually differs within the range 0 to (k−1). Therefore, condition C2 holds.

If the above two conditions are satisfied, during one cycle N nozzles will form k raster lines. Thus, in one cycle, N×k raster lines will be formed. If the third condition, C3, is satisfied, after one cycle (k sub-scan feeds), a nozzle will be at a position that is N×k raster lines away from the nozzle's initial position. Therefore, by satisfying the above three conditions C1 to C3, within the range of N×k raster lines, raster lines can be formed without any voids or overlaps.

The conditions C1 to C3 are not limited to printing scheme in which sub-scan feed amount F is fixed ("fixed feed"). Instead, it is also applicable to a scheme that uses combinations of different feed amounts F ("variable feed").

C-2. Comparative Example

Figure 15:
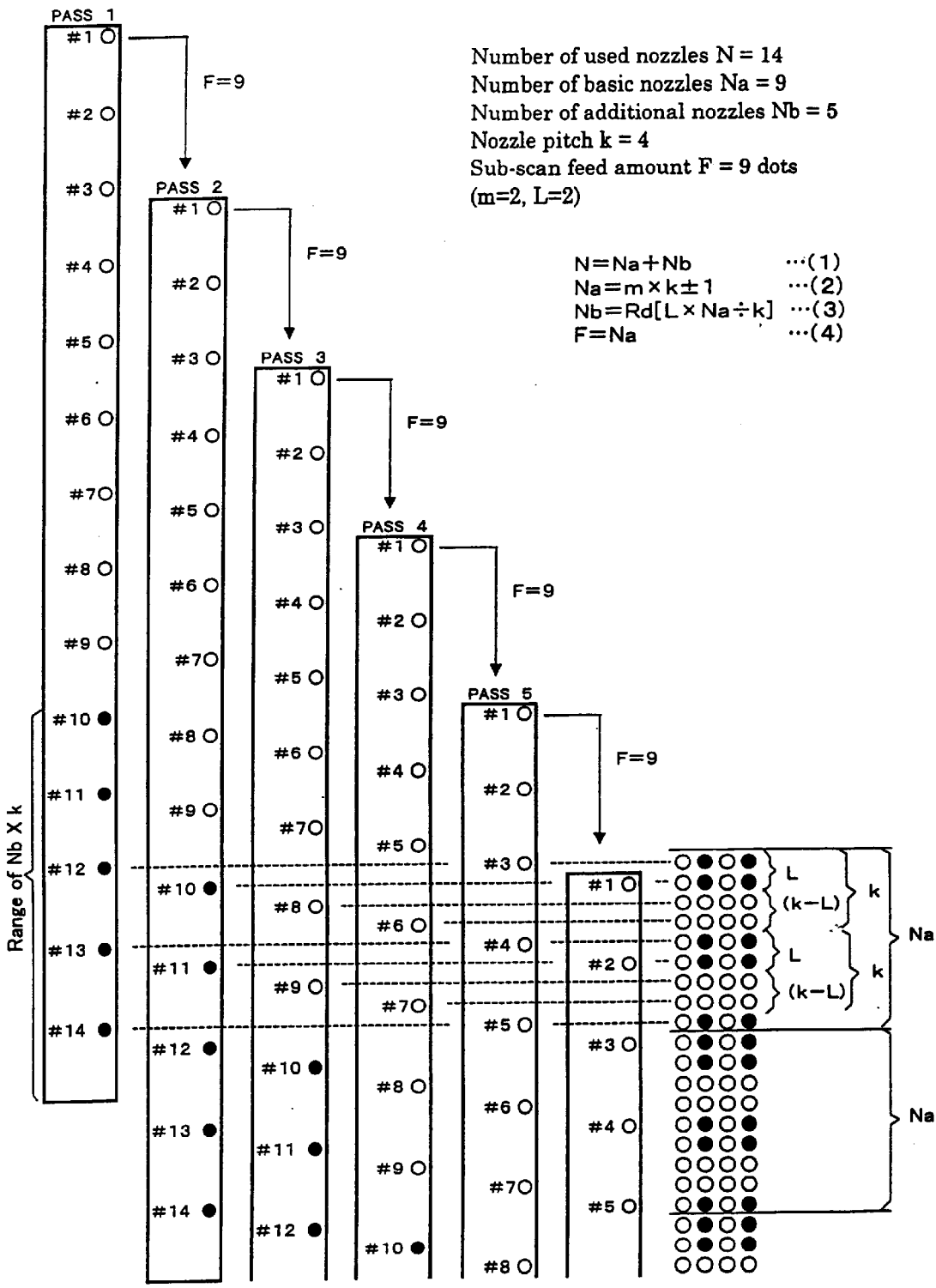
FIG. 15 illustrates a dot printing scheme according to a first comparative example.

FIG. 15 illustrates a dot printing scheme of a first comparative example that is to be compared with the examples of the third and fourth embodiments. This first comparative example is only presented for comparison with the third and fourth embodiments of the present invention. It should be noted that the first comparative example can be an embodiment of the present invention similar to the first and second embodiments. This also applies to the second comparative example described later.

The dot printing scheme of the first comparative example satisfies the following equations (1) to (4).

$$N = N_a + N_b \tag{1}$$

$$N_a = m \times k \pm 1 \tag{2}$$

$$N_b = Rd[L \times N_a \pm k] \tag{3}$$

$$F = N_a \tag{4}$$

where N is the number of nozzles used, k is nozzle pitch, in dots, m is an integer of 1 or more, L is an integer that satisfies $1 \leq L < k$. Operator Rd[ ] indicates the operation of rounding the decimal fraction in the square brackets. The operator ± indicates either addition or subtraction may be used.

The amount F of the sub-scan feed in the first comparative example is a fixed feed of nine dots. As prescribed by equation (4), feed amount F and parameter $N_a$ are mutually equal. The embodiments of the present invention described later satisfy equations (1) to (3), but use a variable feed using a combination of a multiplicity of different sub-scan feed amounts, so equation (4) does not hold. On this point, the first comparative example differs from the third and fourth embodiments described below.

The values of the parameters in the dot printing scheme of FIG. 15 are N=14, $N_a$=9, $N_b$=5, k=4, F=9, m=2 and L=2. Here, the operator ± of the term on the right-hand side of equation (2) is used for subtraction and rounding operation Rd[ ] is used for rounding up. Dot pitch (printing pitch) P in the sub-scanning direction is a value equal to, for example, a printing resolution of 720 dpi (that is, 1/720 inch).

Figure 27:
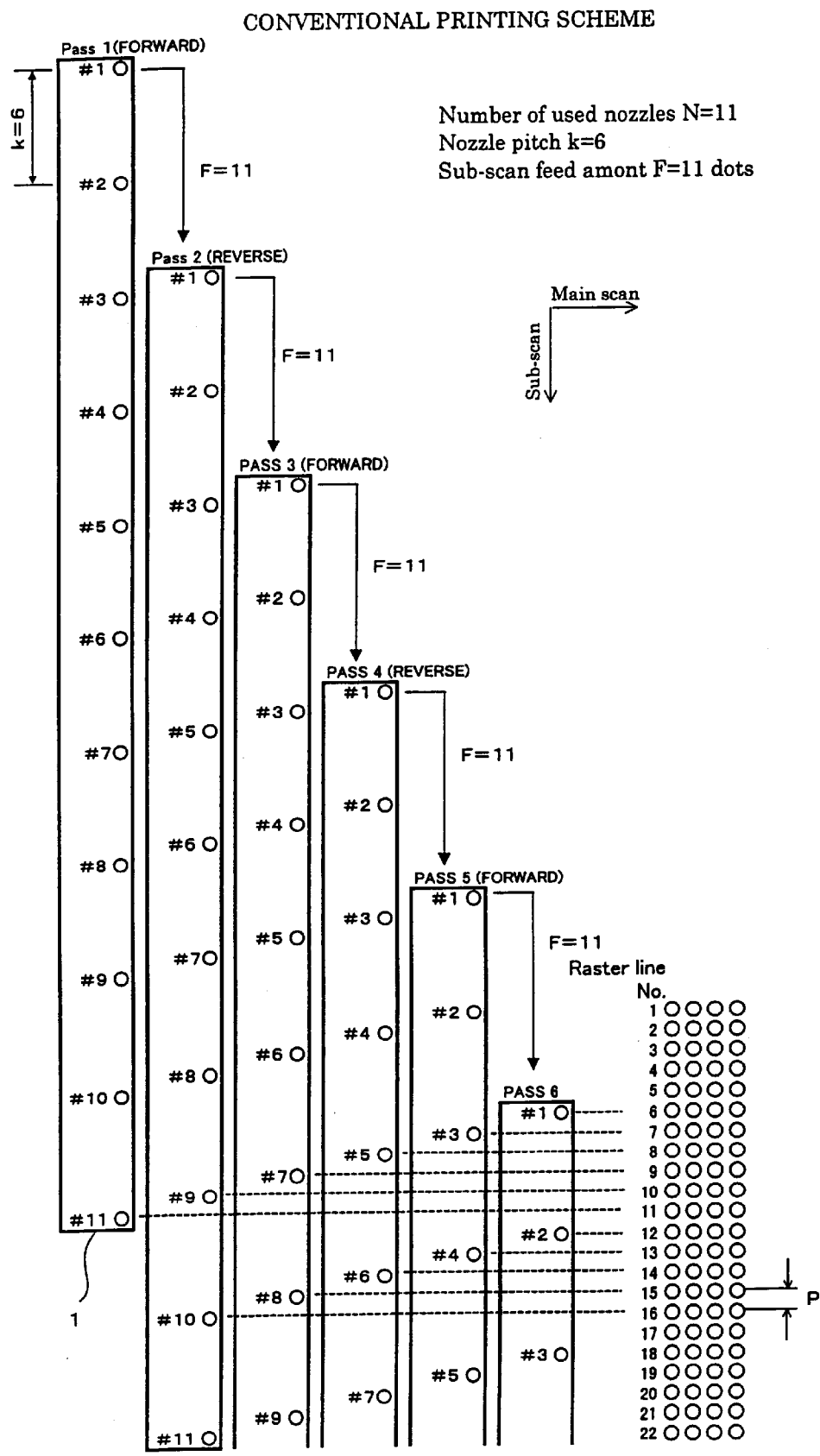
FIG. 27 shows a conventional printing scheme.
Figure 28:
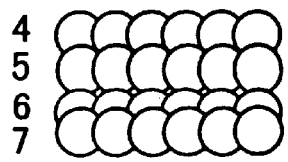
FIG. 28 shows an example of banding.

As shown in the above equation (1), the number N of nozzles used is given as the sum of the two integers $N_a$, $N_b$. $N_a$ is equal to sub-scan feed amount F, and as such corresponds to the number of nozzles used in the conventional printing scheme of FIG. 27. Hereinbelow $N_a$ is referred to as the number of basic nozzles, and the nozzles included in the number of basic nozzles are referred to as the basic nozzles. Similarly, $N_b$ is referred to as the number of additional nozzles, and the nozzles included in the number of additional nozzles are referred to as additional nozzles. In the example of FIG. 15, nine nozzles No. 1 to No. 9 are the basic nozzles and five nozzles No. 10 to No. 14 are additional nozzles. The significance of $N_a$ and $N_b$ is discussed later.

The right-hand side of FIG. 15 shows the positions of the dots on the print medium. Open circles denote the position of dots printed by basic nozzles No. 1 to No. 9, and solid circles denote the position of dots printed by additional nozzles No. 10 to No. 14. The range down from the uppermost raster line depicted by open and solid circles is the actual printing range (printable region). In FIG. 15, no differentiation is made between whether dots are formed during forward or reverse passes.

As can be understood from the printed dot pattern of FIG. 15, raster lines that are the target of printing by additional nozzles No. 10 to No. 14 are also the target of printing by the basic nozzles. In this specification, raster lines printed by both the basic nozzles and the additional nozzles are referred to as overlap raster lines, and raster lines printed only by the basic nozzles are referred to as non-overlap raster lines.

Pixels on overlap raster lines are printed intermittently by one additional nozzle during one main scanning pass, and during other main scanning passes the printing is supplemented by one basic nozzle. In this way, the printing of all of the pixels along the overlap raster is completed. In other words, the overlap raster is printed complementarily by one additional nozzle and one basic nozzle. Here, complementarily means that additional and basic nozzles are used to print the pixels along one raster without voids or overlap.

Each time a main scanning pass is completed by the feed motor 23 (FIG. 3), the paper is moved F dots in the sub-scanning direction, thereby moving the print head 28, from the first pass position in FIG. 15, for example, to the second pass position. In the fifth pass, three basic nozzles No. 3 to No. 5 are positioned on the raster lines already printed by additional nozzles No. 12 to No. 14. In the first pass, these additional nozzles No. 12 to No. 14 are used to print even-numbered pixels along the overlap raster lines, while in the fifth pass the basic nozzles No. 3 to No. 5 are used to print odd-numbered pixels along these same overlap raster lines. This completes the complementary printing relating to the three overlap raster lines. Characters and images are formed on the paper by repeating these operations.

FIG. 16 is an enlarged view of dots formed by the first comparative example. In FIG. 16, open circles denote dots printed by basic nozzles and solid circles denote dots printed by additional nozzles. In this example, the positions of dots printed by the additional nozzles are slightly offset in the sub-scanning direction (vertically with respect to FIG. 16) from the positions of dots on the same raster printed by basic nozzles.

As described with reference to the conventional technology, when multiple feed passes are implemented in the sub-scanning direction between adjacent printed raster lines, the error of the multiple sub-scan feed passes accumulates, causing the pitch of adjacent raster lines to deviate from the correct pitch, producing banding. In the case of the first comparative example, however, although the error of multiple sub-scanning passes (transport error) between two adjacent raster lines accumulates, because some of the dots on one of the raster lines are printed by additional nozzles, it is difficult to perceive the banding as such. As shown by FIG. 16, this is because the positions of dots printed by the additional nozzles are slightly offset in the sub-scanning direction from the positions of dots on the same raster printed by basic nozzles.

The significance of the parameters in the equations (1) to (4) can be thought of as follows. As shown by equations (2) and (4), the sub-scan feed amount F is fixed at (m×k±1) dots. That is, feed amount F is set to a value obtained by adding or subtracting 1 from a value that is an integer multiple of nozzle pitch k. If it is assumed that the sub-scan feed amount F is set at an integer multiple of nozzle pitch k, after each sub-scan feed the position of each nozzle would revert to the position in the nozzle cycle prior to the said sub-scan feed (that is, the position every k dots). Therefore, if the feed amount F is (m×k±1) dots, after the sub-scan feed each nozzle would be located at the position in its cycle prior to the sub-scan feed plus or minus just one dot. In the case of FIG. 15, the feed amount F is (2×4+1)=nine dots, so after the sub-scan feed, the nozzle will be displaced by just the amount of plus one dot in the sub-scanning direction compared to the nozzle cycle position prior to the sub-scan feed.

By ignoring the rounding operator Rd in the equation (3) and using equation (4), it is possible to transpose equation (3) into the following equation (3a).

$$L = (Nb \times k)/Na \quad (3a)$$
$$= (Nb \times k)/F$$

The numerator (Nb×k) of equation (3a) is the number Nb of additional nozzles multiplied by nozzle pitch k, and shows the range of the additional nozzles within the nozzle array. In the example of FIG. 15, the range of the additional nozzles is from the raster position of nozzle No. 10 to the raster position three dots below nozzle No. 14. Parameter L is substantially equal to (Nb×k) divided by the sub-scan feed amount F, so L can be thought of as a value indicating how many sub-scan feeds is required for a particular nozzle (the topmost additional nozzle No. 10, for example) to pass through the range of the additional nozzles. However, as described above, after one sub-scan feed, each nozzle is displaced by just one dot relative to the preceding position in the nozzle cycle. Considering L sub-scan feeds following a given pass, within the space of L sub-scan feeds the additional nozzle No. 10 stays within the additional nozzle range, and with each sub-scan feed, the nozzle is moved one dot from the cyclic nozzle position in the preceding pass. With reference to FIG. 15, in the second sub-scan feed following the first pass, the topmost additional nozzle No. 10 stays within the additional nozzle range of the first pass until the second sub-scan feed in the third pass, and with each sub-scan feed is moved one more dot from the cyclic nozzle position in the immediately preceding pass. That is, in the second pass, in the additional nozzle range of the first pass the additional nozzle No. 10 is positioned one dot after the position of nozzle No. 12 in the preceding first pass. Also, in the third pass, in the additional nozzle range of the first pass the additional nozzle No. 10 is positioned one dot after the position of nozzle No. 12 in the preceding second pass.

When this movement of the nozzle positions is considered, parameter L can be thought of as a value that shows how many overlap raster lines (raster lines formed by basic and additional nozzles) are continuously arrayed. In the case of the first comparative example illustrated by FIG. 15, for example, L=2, meaning two overlap raster lines are continuously formed. (FIG. 15 also includes a portion in which there are three overlap raster lines in a row, the reason for which will be described later below.) Moreover, additional nozzles are provided at a pitch k within the nozzle array, so of k continuous raster lines, the first L raster lines will be overlap raster lines and the remaining (k−L) raster lines will be non-overlap raster lines. Therefore, raster lines are formed as repeated arrays of raster line groups comprised of L overlap raster lines and (k−L) non-overlap raster lines.

Of Na raster lines printed in one main scanning pass by Na basic nozzles, Nb raster lines printed by Nb additional nozzles are overlap raster lines and the remaining (k−L) raster lines are non-overlap raster lines. Thus, within the extent of Na raster lines, there is a repetition of groups of raster lines comprised of L overlap raster lines and (k−L) non-overlap raster lines so that Nb of the Na raster lines are overlap raster lines and the remaining (Nb−Na) raster lines are non-overlap raster lines. In the first comparative example shown in FIG. 15, k=4, Na=9 and Nb=5, so within the range of nine raster lines, there is a repetitive array of raster groups each comprised of two overlap raster lines and two non-overlap raster lines, and five of the nine are overlap raster lines and the remaining four are non-overlap raster lines.

At the right-hand side of FIG. 15 the raster lines are shown divided into sets of Na raster lines. In this example, the last of each set of Na raster lines is an overlap raster, and the first L (=2) raster lines of the next set are also overlap raster lines. Consequently, at the boundary between each set of Na raster lines, there are three adjacent overlap raster lines. Basically, however, it can be understood the raster arrangement of FIG. 15 is comprised of repeated arrays of raster groups comprised of L overlap raster lines and (k−L) non-overlap raster lines.

Thus, in the first comparative example overlap raster lines and non-overlap raster lines are arranged in a substantially regular array in accordance with parameters k, L, Na and Nb. That is, substantially L continuous overlap raster lines are arranged in a substantially regular array on each side of (k−L) non-overlap raster lines. As described with reference to FIG. 16, banding in the vicinity of overlap raster lines is not readily noticeable, so this arrangement has the advantage of improving the image quality.

In the case of bidirectional printing, the above regular array of overlap raster lines provides the following effect. As shown in FIG. 5, when a nozzle array of six ink colors is used to print the same raster, during the forward pass dots are formed along each raster in the order of K, C, LC (light cyan), M, LM (light magenta), and Y. On the reverse pass, dots are formed on each raster in the reverse order, that is, Y, LM, M, LC, C, K. This means it may be possible to see a slight difference between raster lines printed during a forward pass and raster lines printed during a reverse pass. If overlap raster lines are not formed, and instead all dots are printed by the non-overlap scheme, the result can be degradation of image quality by making the differences in color between the forward and reverse passes more noticeable. Since overlap raster lines are printed on forward and reverse passes, in the vicinity of the overlap raster lines differences in color between the raster lines produced by forward and reverse passes become less noticeable.

All raster lines could be formed as overlap raster lines to make banding less noticeable. However, the main scanning time needed to print an overlap raster is approximately twice that required to print a non-overlap raster, so making all the raster lines overlap raster lines would halve the printing speed. Partial overlap provides a mixture of overlap and non-overlap raster lines, and therefore has the advantage of not reducing the printing speed as much as an full-overlap raster arrangement would.

Figure 17:
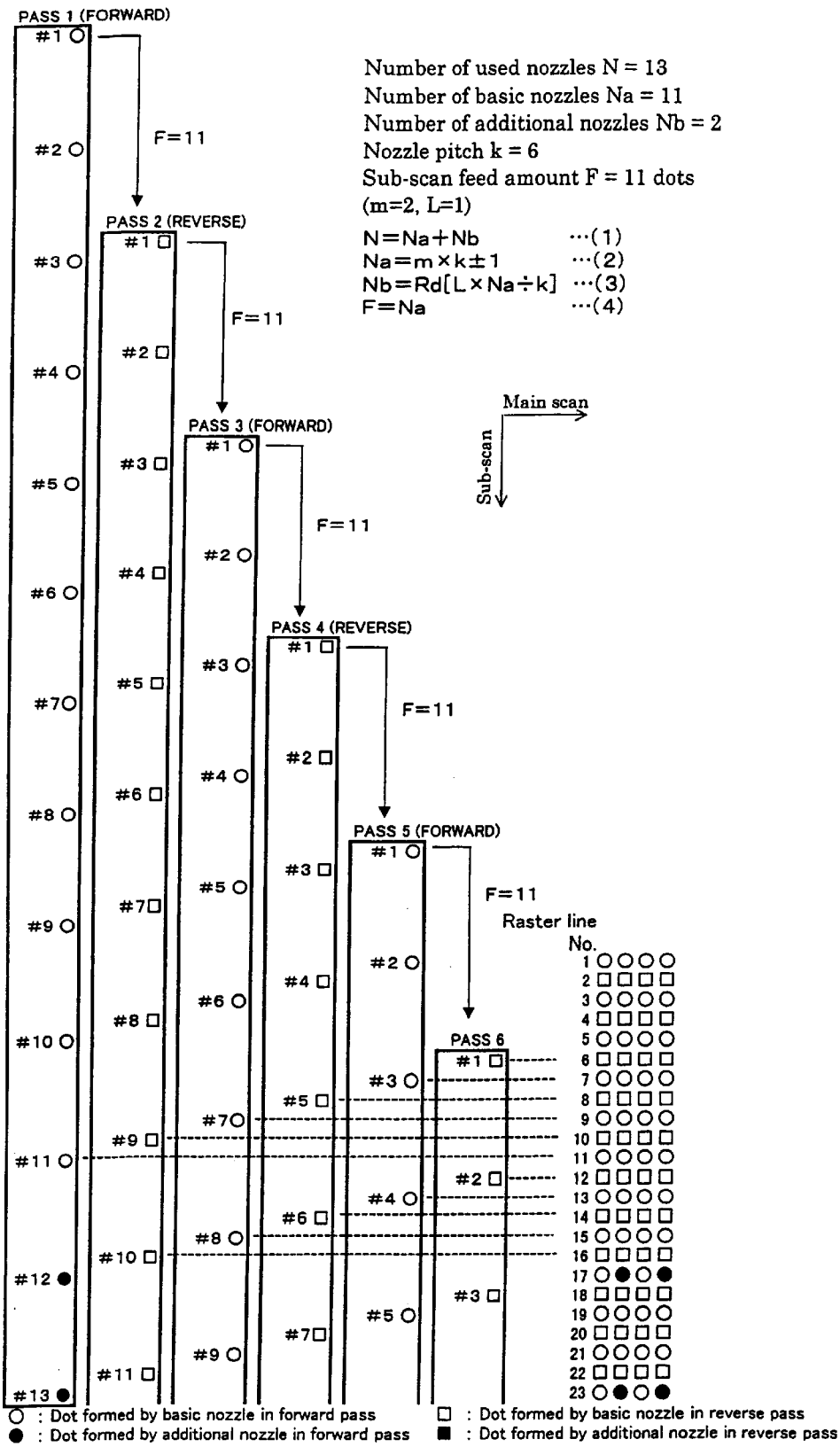
FIG. 17 illustrates a dot printing scheme according to a second comparative example.

FIGS. 17 and 18 illustrate a dot printing scheme of a second comparative example. The parameter values of this scheme are N=13, Na=11, Nb=2, k=6, F=11, m=2 and L=1. These parameters satisfy equations (1) to (4). Dot positions along the raster lines are divided into four types, with an open circle denoting a position at which a basic nozzle prints during a forward pass, a solid circle denoting a position at which an additional nozzle prints during the forward pass, an open square denoting a position at which a basic nozzle prints during a reverse pass, and a solid square denoting a position at which an additional nozzle prints during a reverse pass.

As in FIG. 15, the meaning of parameters Na, L and k is shown in FIG. 18. Thus, this second comparative example, too, is characterized by comprising substantially L continuous overlap raster lines arranged in a substantially regular array on each side of (k−L) non-overlap raster lines.

Figure 19:
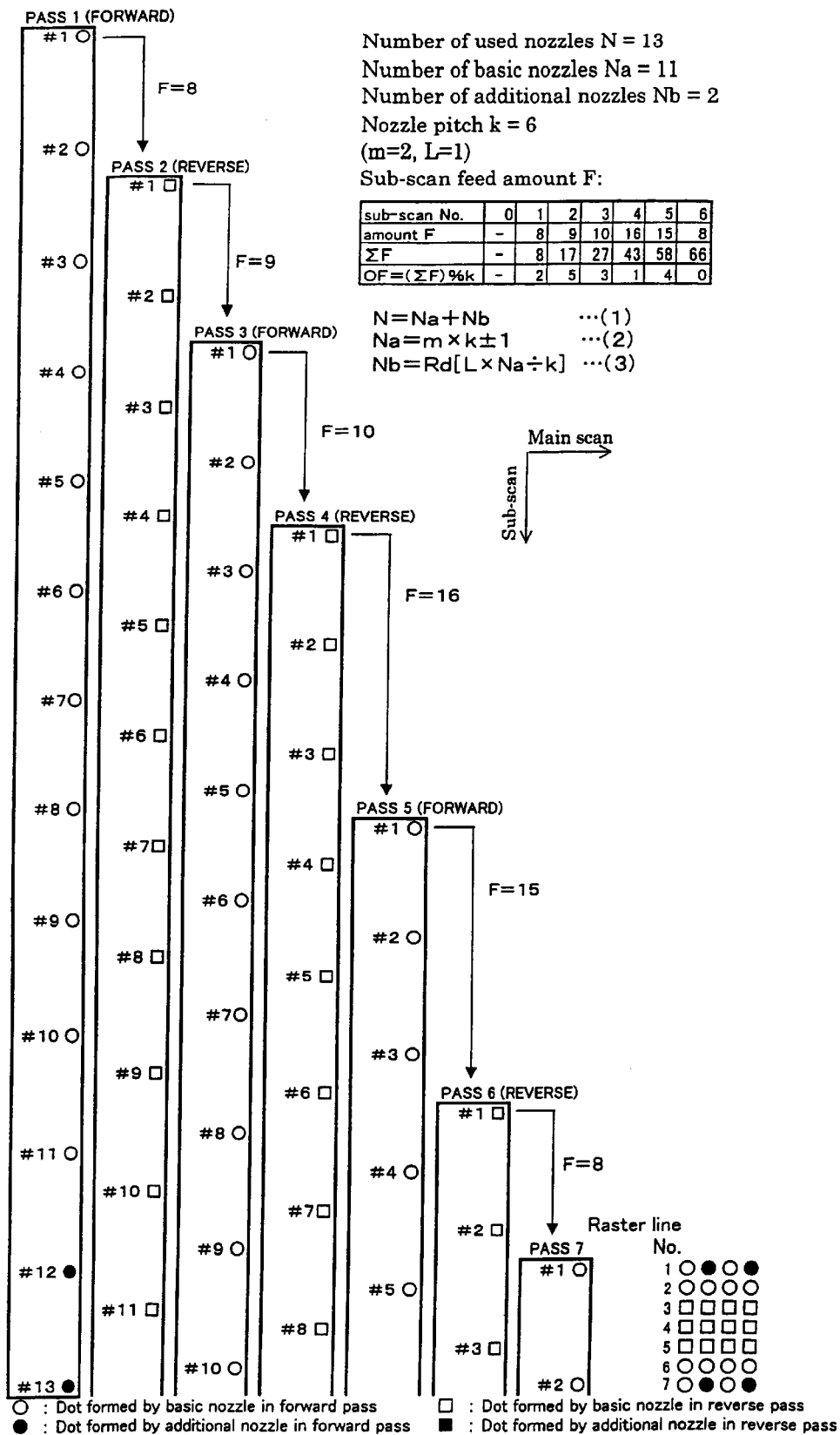
FIG. 19 illustrates a dot printing scheme according to a third comparative example.

C-3. Details of Third and Fourth Embodiments:

FIGS. 19 and 20 show a dot printing scheme according to a third embodiment. The parameter values of this scheme are N=13, Na=11, Nb=2, k=6, m=2 and L=1. A variable sub-scan feed scheme is used in which one cycle of sub-scan feed is comprised of feed amount F of (8, 9, 10, 16, 15, 8) dots; this feed amount cycle is repeated. These parameters satisfy equations (1) to (3), shown here again.

$$N = Na + Nb \quad (1)$$

$$Na = m \times k \pm 1 \quad (2)$$

$$Nb = Rd[L \times Na \pm k] \quad (3)$$

The third embodiment also satisfies the following conditions C1' to C3', which are similar to the conditions C1 to C3.

Condition C1': The number of sub-scan feed passes of one cycle equals nozzle pitch k.

Condition C2': The offset OF of a nozzle after each sub-scan feed pass in a cycle is a value that differs within the range 0 to (k−1).

Condition C3': The average sub-scan feed amount ($\Sigma F/k$) is equal to the number Na of basic nozzles used. In other words, the cumulative value $\Sigma F$ of the sub-scan feed amounts F per cycle is equal to a value (Na×k) obtained by multiplying the number Na of basic nozzles used by the nozzle pitch k.

Conditions C1' and C2' are the same as conditions C1 and C2. In C3', "the number Na of basic nozzles used" is used in place of "the number N of nozzles used" of C3. The third embodiment differs from the second comparative example in that the third embodiment uses a variable feed, and the other parameters are the same as those of the second comparative example. The first and second embodiments described before also satisfy conditions C1' to C3', but a detailed explanation of the parameters is omitted.

Figure 21:
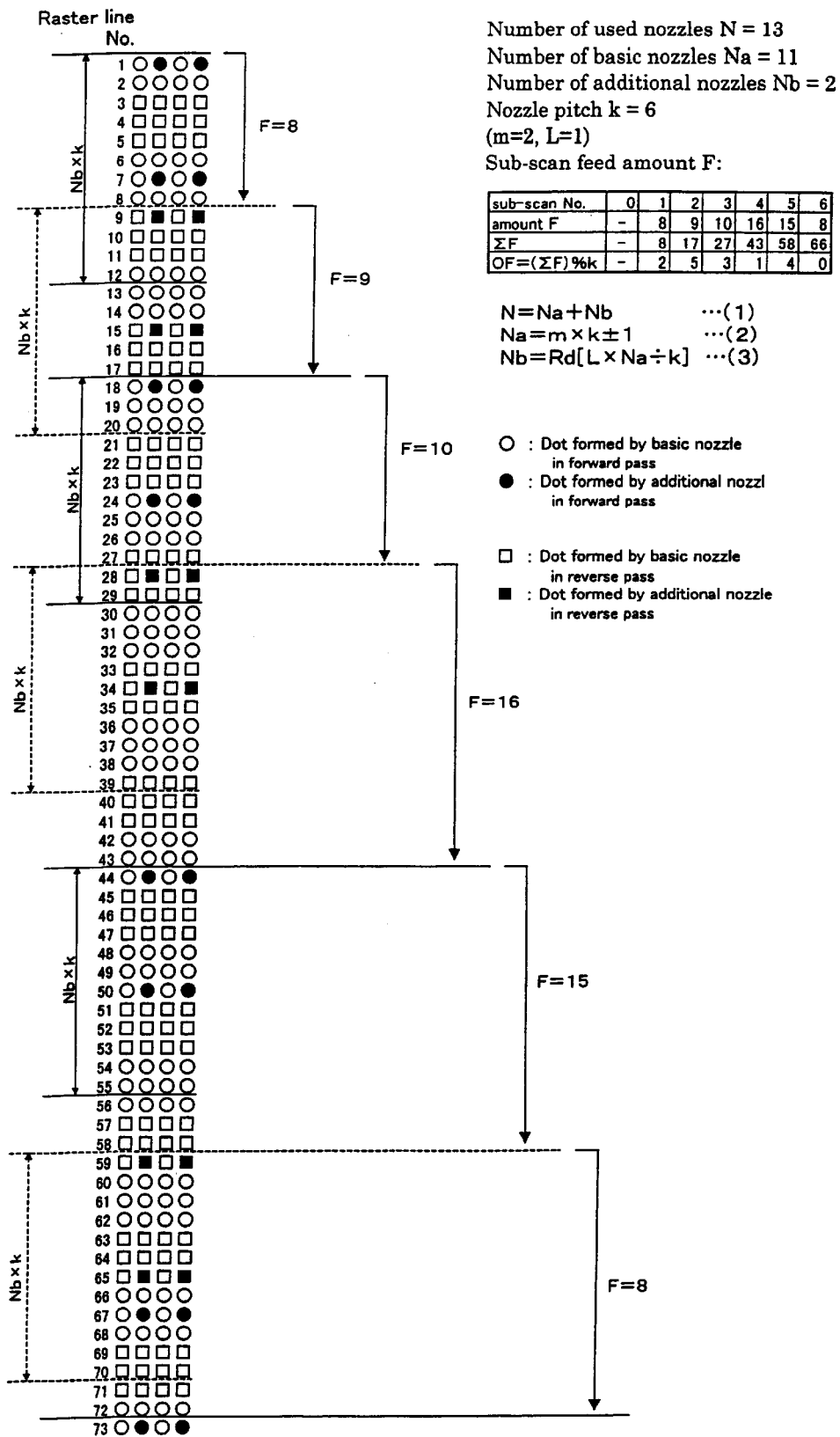
FIG. 21 illustrates the dot printing scheme according to the third comparative example.

FIG. 21 shows the dot printing positions used in the example of the third embodiment. In FIG. 21, the range of the additional nozzles for (Nb×k) raster lines is being sequentially displaced a feed amount F at a time. Considered with respect to a given one main scanning pass only, within the range of the additional nozzles for (Nb×k) raster lines, additional nozzles (denoted by a solid circle or solid square) are disposed at regular intervals of k dots. When the sub-scan feed amount F is fixed, as in the second comparative example, the range of the additional nozzles is displaced by the fixed amount F each time, forming overlap raster lines in a substantially regular array. In contrast, in the third embodiment the feed amount F is not fixed but is comprised of a combination of a multiplicity of different amounts. Therefore, the overlap raster lines do not have the type of regularity provided by the first and second comparative examples. In the case of the third embodiment, overlap raster lines are arranged in an appropriately scattered manner that has the effect of improving image quality by making banding less noticeable than the comparative examples. The rather random distribution of overlap raster lines according to the third embodiment makes it possible to obtain a higher image quality than that of the second comparative example. The printing speed in the case of a partial overlap type dot printing scheme is substantially proportional to the number Na of basic nozzles. That is, the net number of raster lines printed during one main scanning pass does not depend on the number Nb of additional nozzles but is equal to the number Na of basic nozzles. The second comparative example and the third embodiment both have the effect of improving image quality by making banding less noticeable. The fairly random disposition of the raster lines in the case of the third embodiment offers the potential of obtaining better image quality than that of the second comparative example. However, whether higher image quality can be achieved by the second comparative example or by the third embodiment depends on the manufacturing tolerance with respect to the nozzle pitch k of the print head 28. If the sub-scan feed amount in the second comparative example were not fixed but variable as in the third embodiment, among dot printing schemes having substantially the same printing speed, it would have the advantage of allowing a setting to select one scheme that is desirable in terms of image quality.

Figure 22:
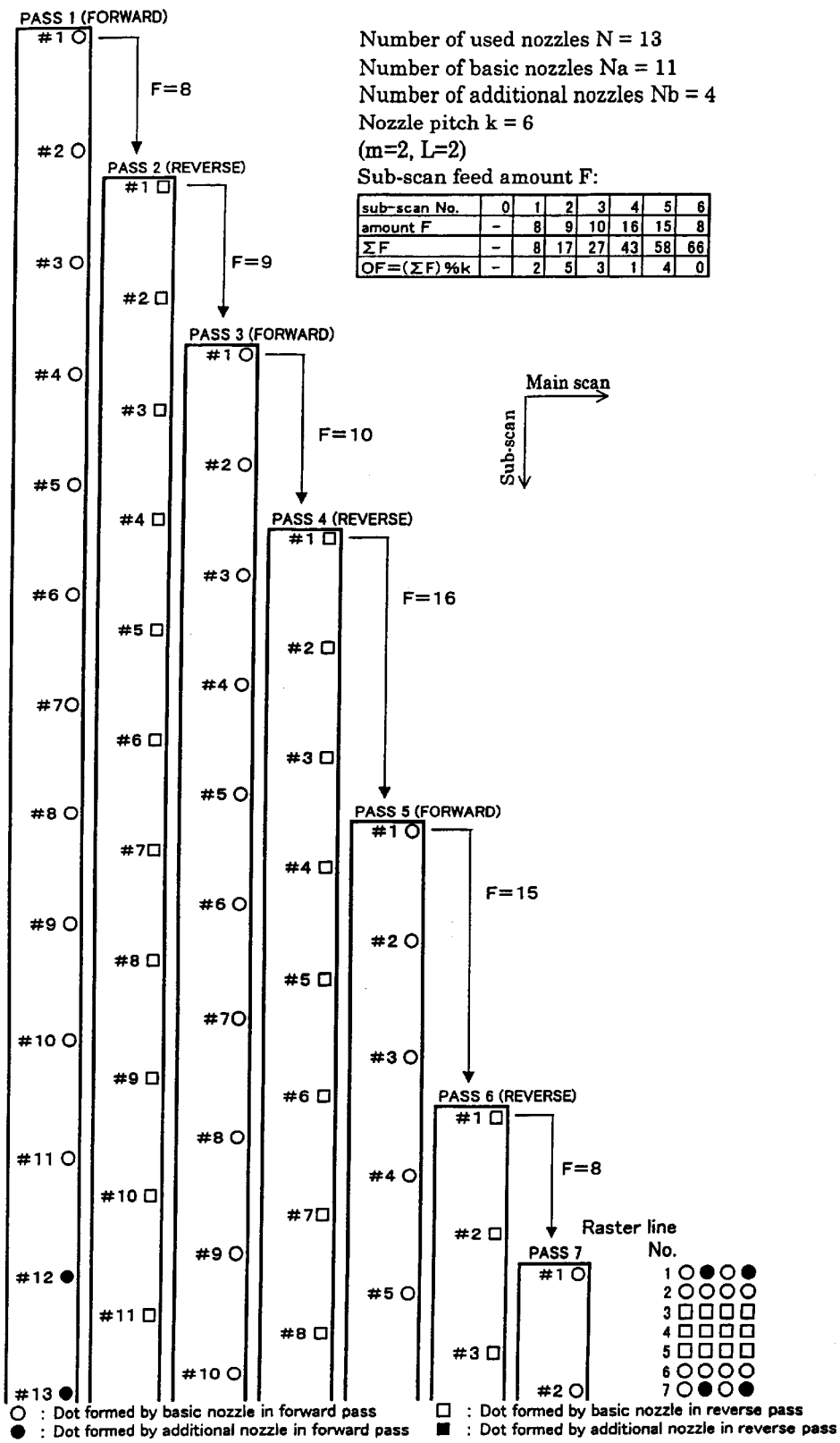
FIG. 22 illustrates a dot printing scheme according to a fourth comparative example.

FIGS. 22 and 23 show a fourth embodiment of a dot printing scheme. The parameter values of this scheme are N=15, Na=11, Nb=4, k=6, m=2 and L=2. This embodiment also uses a variable sub-scan feed scheme. These parameters satisfy equations (1) to (3) and conditions C1' to C3'. The fourth embodiment has a different number Nb of additional nozzles to the third embodiment, but the same number Na of basic nozzles, and can therefore print at the same speed as the third embodiment.

FIG. 24 shows the positioning of the printed dots in the fourth embodiment. It can be seen that this embodiment also attains a scattered overlap raster arrangement. Thus, as in the case of the third embodiment, it has the effect of improving image quality by making banding less noticeable.

In addition to the dot printing schemes of the third and fourth embodiments, various other dot printing schemes can be adopted that satisfy the equations (1) to (3). FIGS. 25(A)–25(C) shows an example of a possible combination of printing scheme parameters in which k=6 and L=1 to 3. The case of k=6, L=1, m=2, Na=11, Nb=2 and N=13 of FIG. 25(A) correspond to the third embodiment of FIGS. 19 to 21. Also, the case of k=6, L=2, m=2, Na=11, Nb=4 and N=15 of FIG. 2(B) correspond to the fourth embodiment of FIGS. 22 to 24. FIGS. 26(A)–26(C) shows an example of a possible combination of printing scheme parameters in which k=4 and L =1 to 3. In these examples, the operator Rd[ ] of equation (3) is rounding up, but rounding down can also be used.

As can be seen from FIGS. 25 and 26, when nozzle pitch k is given, a desirable number Na of basic nozzles and number Nb of additional nozzles can be determined by setting parameters m and L to a suitable value, and the sum of these numbers is used to decide the number N of nozzles used. Conversely, when the number N of nozzles used is decided, by using FIGS. 25(A)–25(C) and FIGS. 26(A)–26(C) the number N of nozzles used can be used to determine the desirable number Na of basic nozzles and number Nb of additional nozzles.

PROM 42 (FIGS. 3 and 7) stores dot printing scheme information including parameters for a plurality of dot printing schemes having substantially the same printing speeds. PROM 42 also stores scheme selection information for specifying which of the plurality of dot printing schemes is a preferred one. "Printing schemes having substantially the same printing speed" refers to printing schemes in which differences in the number Na of basic nozzles is within 10%. For example, PROM 42 contains two sets of dot printing scheme information that includes the parameters of the two printing schemes of the third and fourth embodiments. Which of the two schemes is preferred in terms of image quality depends on the actual manufacturing errors of the print head 28. Which of two printing schemes is preferable is determined on an inkjet printer by printer basis, and the information specifying the preferred scheme is stored in the PROM 42. This makes it possible to select, on the basis of image quality, between two dot printing schemes that print at the same speed. Information on three or more printing schemes can also be stored. Available schemes can also include what utilize a fixed feed as in the case of the second comparative example.

The third and fourth embodiments use partial overlapping and variable sub-scan feed capability, making it possible to suitably scatter overlap raster lines. This makes it possible to improve image quality by making banding less noticeable. Especially when bidirectional printing is used, the scattered distribution of overlap raster lines has the advantage of reducing differences in color between the raster lines produced during a forward pass and those producing during a reverse pass. Selecting a preferable one, in terms of image quality, among a plurality of dot printing schemes having substantially the same printing speed will attain high image quality for indivisual printers.

The third and fourth embodiments are also applicable to unidirectional printing where dot printing is executed in only one direction of the main scan, for example, only in forward passes.

Although the basic nozzles and the additional nozzles complementarily execute dot printing on raster lines, the dot printing positions of the basic nozzles and the additional nozzles may overlap on raster lines. Other schemes may be also applied to the dot printing scheme of the present invention. In one embodiment, for example, the basic nozzles and the additional nozzles complementarily execute dot printing on raster lines, and the size of dots formed by the additional nozzles is set larger than that formed by the basic nozzles.

The dot printing control is executed by the CPU 41 of the printer 22 in the embodiment. This reduces work load of the computer 90 because the printer driver 96 may output the image data in a predetermined format regardless of the dot printing scheme used in the printer. The image data setting in the control routines can be done in the computer 90 but not in the printer 22. In this case, "data relating to the dots to be formed during the first scanning pass", "the amount of paper feed in the sub-scanning direction", and "data relating to the dots to be formed during the second main scanning pass" will be sequentially sent to the printer 22, so the image data output by the computer 90 will change according to the dot printing scheme used. An advantage of adopting such a method is that it would facilitate software upgrades. That is, it would allow a new dot printing scheme to be used without changing the program stored in the PROM 42.

Controlling the head to print the dots includes computer-based processing, so a configuration could be used in which the control program is stored on storage media. Such storage media includes flexible disks, CD-ROM, magnetic disks, IC cards, ROM cartridges, punched cards, printed material on which bar codes or other such symbols are printed, internal computer storage devices such as RAM or ROM memories, as well as external storage devices and other such computer readable media. A configuration can also be used in which a computer program for effecting the head control functions can be supplied to the computer via a telecommunication channel.

This invention can be applied to monochrome printing as well as color printing. It can also be applied to produce multiple gradations to express a pixel by using multiple types of dots. The invention can also be applied to a drum-scanning printer, in which case the main scanning direction would be the direction of drum rotation, and the sub-scanning direction would be the direction of carriage travel. This invention is applicable not only to inkjet printers but to all dot printing apparatuses that use a print head having an array of multiple dot forming elements to print on printing media. Here, "dot forming elements" refers to elements used to form dots such as the ink nozzles of an inkjet printer.

While the configurations of the above embodiments have been described in terms of hardware, the configurations may be partially replaced by software. Conversely, software-based configurations may be partially replaced by hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dot printing apparatus that uses a dot printing head to print dots on a printing medium, said dot printing apparatus comprising:

a dot forming element array provided on the dot printing head comprising a plurality of dot forming elements arrayed to achieve printing of dots of at least one color along a plurality of main scanning lines during a main scanning pass, and to achieve formation of multiple dots of an identical color at a substantially fixed pitch in a sub-scanning direction;

a main scanning drive that effects main scanning by driving at least one selected from the dot printing head and the printing medium;

a head drive that uses at least a portion of the plurality of dot forming elements to form dots during the main scanning; and a sub-scanning drive that on completion of each main scan effects sub-scanning by driving at least one selected from the dot printing head and the printing medium;

wherein the head drive causes only a specific part of the plurality of dot forming elements but not all of the dot forming elements to execute intermittent dot formation such that dot printing is executed in one main scanning pass at intermittent locations on at least one target main scanning line which is also a target of dot printing during another main scanning pass, thereby effecting partial overlap printing.

2. A dot printing apparatus according to claim 1, wherein the sub-scanning drive executes a variable sub-scan feed using a combination of differing feed amounts.

3. A dot printing apparatus according to claim 2, wherein the head drive effects bidirectional printing in which dot printing is executed during forward and reverse main scanning passes.

4. A dot printing method that uses a dot printing head to print dots on a printing medium, the dot printing head having a dot forming element array comprising a plurality of dot forming elements arrayed to achieve printing of dots of at least one color along a plurality of main scanning lines during a main scanning pass, and to achieve formation of multiple dots of an identical color at a substantially fixed pitch in a sub-scanning direction, said dot printing method comprising the step of:

effecting partial overlap printing, using only a specific part of the plurality of dot forming elements, but not all of the dot forming elements by executing intermittent dot formation such that dot printing in one main scanning pass at intermittent locations on at least one target main scanning line which is also a target of dot printing during another main scanning pass.

5. A dot printing method according to claim 4, wherein the sub-scanning is executed according a variable sub-scan feed using a combination of differing feed amounts.

6. A dot printing method according to claim 5, wherein dot printing is executed during forward and reverse main scanning passes.

7. A dot printing method according to claim 5, further comprising the step of:

providing printing scheme information representing multiple dot printing schemes that print at substantially the same speed;

wherein the multiple dot printing schemes include at least one partial overlap type, variable-feed dot printing scheme utilizing a variable sub-scan feed comprising a combination of multiple, different feed amounts, in which the specific part of the plurality of dot forming elements execute dot printing in one main scanning pass on at least one target main scanning line which is also a target of dot printing during another main scanning pass; and the main scanning, sub-scanning and dot printing are executed in accordance with a selected one among the multiple dot printing schemes.

8. A computer program product for use in a computer including a printing device having a dot printing head to print dots on a printing medium, the dot printing head having a dot forming element array comprising a plurality of dot forming elements arrayed to achieve printing of dots of at least one color along a plurality of main scanning lines during a main scanning pass, and to achieve formation of multiple dots of an identical color at a substantially fixed pitch in a sub-scanning direction, the computer program product comprises:

a computer program for causing a computer to effect partial overlap printing, using only a specific part of the plurality of dot forming elements, but not all of the dot forming elements by executing intermittent dot formation such that dot printing is executed in one main scanning pass at intermittent locations on at least one target main scanning line which is also a target of dot printing during another main scanning pass; and a computer readable medium storing the computer program.

9. A computer program product according to claim 8, wherein the sub-scanning is executed according to a variable sub-scan feed using a combination of differing feed amounts.

* * * * *